US009591364B2

(12) United States Patent
Kinoshita

(10) Patent No.: US 9,591,364 B2
(45) Date of Patent: Mar. 7, 2017

(54) IMAGE PROCESSING APPARATUS, IMAGE PROCESSING METHOD, AND PROGRAM

(71) Applicant: Sony Corporation, Tokyo (JP)

(72) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/764,781

(22) PCT Filed: Jan. 16, 2014

(86) PCT No.: PCT/JP2014/000197
§ 371 (c)(1),
(2) Date: Jul. 30, 2015

(87) PCT Pub. No.: WO2014/132548
PCT Pub. Date: Sep. 4, 2014

(65) Prior Publication Data
US 2015/0373414 A1 Dec. 24, 2015

(30) Foreign Application Priority Data

Feb. 28, 2013 (JP) ................................ 2013-038795

(51) Int. Cl.
*H04N 5/93* (2006.01)
*H04N 21/472* (2011.01)
(Continued)

(52) U.S. Cl.
CPC ... *H04N 21/47205* (2013.01); *G06K 9/00268* (2013.01); *G06K 9/00288* (2013.01);
(Continued)

(58) Field of Classification Search
CPC .......... H04N 5/23216; H04N 5/23219; H04N 5/23293; H04N 21/47205; H04N 9/79;
(Continued)

(56) References Cited

U.S. PATENT DOCUMENTS 8,745,509 B2 * 6/2014 Itahana .................. G06F 1/1645
345/619
8,903,200 B2 * 12/2014 Yamaji .................... G06T 11/60
382/173
(Continued)

FOREIGN PATENT DOCUMENTS

| JP | 2008-098739 | * | 4/2008 |
| JP | 2008-098739 | A | 4/2008 |
| JP | 2008-098755 | A | 4/2008 |
| JP | 2008-262416 | A | 10/2008 |
| JP | 2009-246558 | A | 10/2009 |
| JP | 2012-190183 | A | 10/2012 |

OTHER PUBLICATIONS

International Search Report; International Application No. PCT/JP2014/000197; Filed: Jan. 16, 2014. (Form PCT/ISA/210).
(Continued)

*Primary Examiner* — Robert Chevalier
(74) *Attorney, Agent, or Firm* — Michael Best & Friedrich LLP

(57) ABSTRACT

An information processing apparatus may include a control device. The control device may generate display data including a main image for display in a first area of a display area and a list of candidate images for display in a second area of the display area at a same time the main image is displayed in the first area, wherein the candidate images are extracted from and represent respective objects in the main image. Also, the control device may receive an input from a user to select one candidate image from the list, wherein the display data is generated based on selection of the one candidate image.

19 Claims, 17 Drawing Sheets

(51) Int. Cl.
<table>
<tr><td>H04N 5/232</td><td>(2006.01)</td></tr>
<tr><td>G06K 9/00</td><td>(2006.01)</td></tr>
<tr><td>G11B 27/036</td><td>(2006.01)</td></tr>
<tr><td>H04N 9/79</td><td>(2006.01)</td></tr>
</table>

(52) U.S. Cl.
CPC ....... *G11B 27/036* (2013.01); *H04N 5/23216* (2013.01); *H04N 5/23219* (2013.01); *H04N 5/23293* (2013.01); *H04N 9/79* (2013.01)

(58) Field of Classification Search
CPC ........... G06K 9/00288; G06K 9/00268; G11B 27/036
USPC ........ 386/282, 281, 210, 224, 223, 230, 323
See application file for complete search history.

(56) References Cited

U.S. PATENT DOCUMENTS

<table>
<tr><td>2007/0033626 A1</td><td>2/2007</td><td>Yang et al.</td></tr>
<tr><td>2009/0244354 A1</td><td>10/2009</td><td>Sakaguchi</td></tr>
<tr><td>2010/0315542 A1</td><td>12/2010</td><td>Yoshino</td></tr>
</table>

OTHER PUBLICATIONS

PCT Written Opinion of the International Searching Authority; International Application No. PCT/JP2014/000197; International Filing Date: Jan. 16, 2014 (Form PCT/ISA/237).
Japanese Office Action issued Sep. 29, 2015 for corresponding Japanese Application No. 2013-038795.

\* cited by examiner

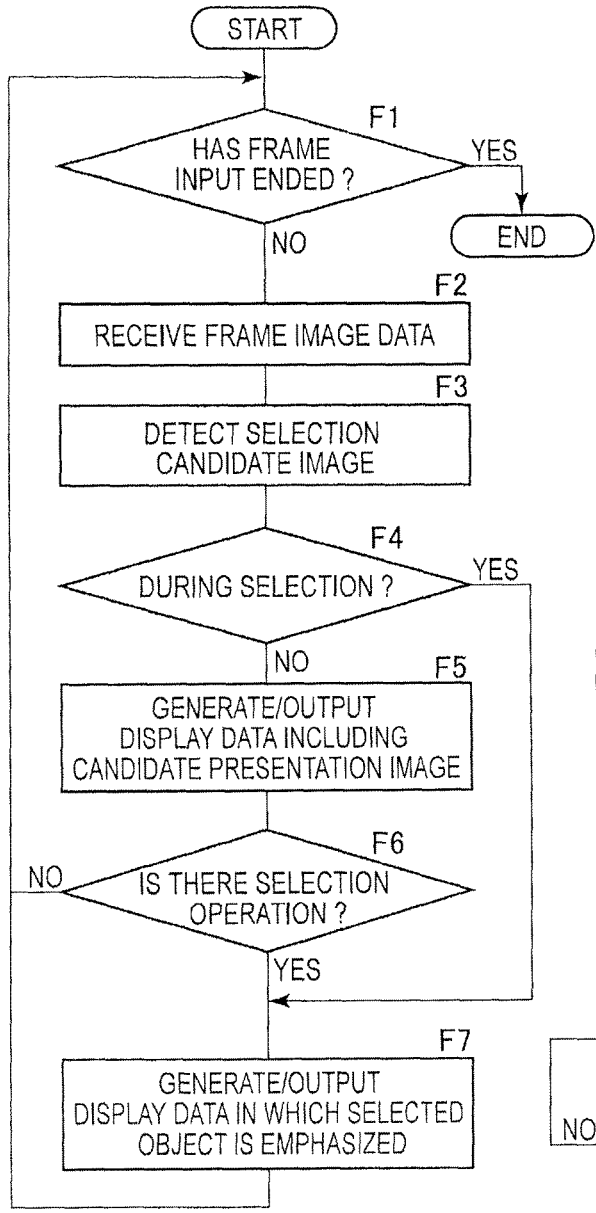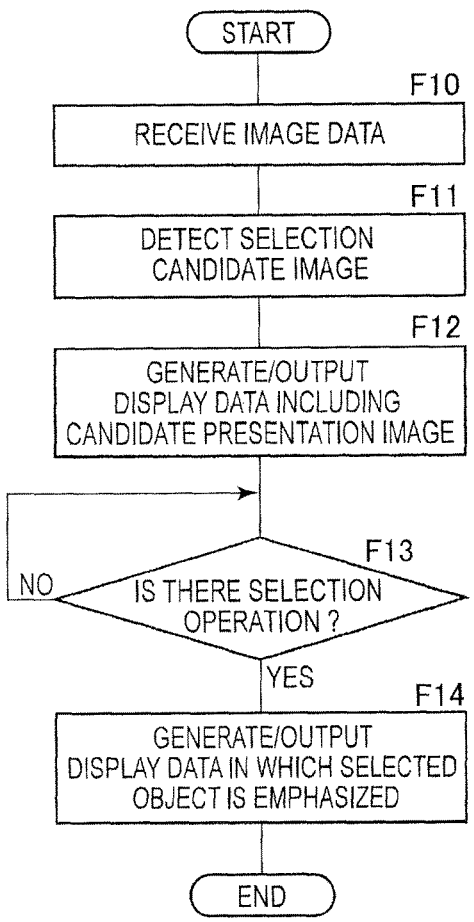

CAPTURED IMAGE (MAIN IMAGE)

COMBINING OF CANDIDATE PRESENTATION IMAGE

SELECTION OPERATION IN CANDIDATE PRESENTATION IMAGE

DISPLAY EXAMPLE AFTER SELECTION

DISPLAY EXAMPLE AFTER SELECTION

DISPLAY EXAMPLE AFTER SELECTION

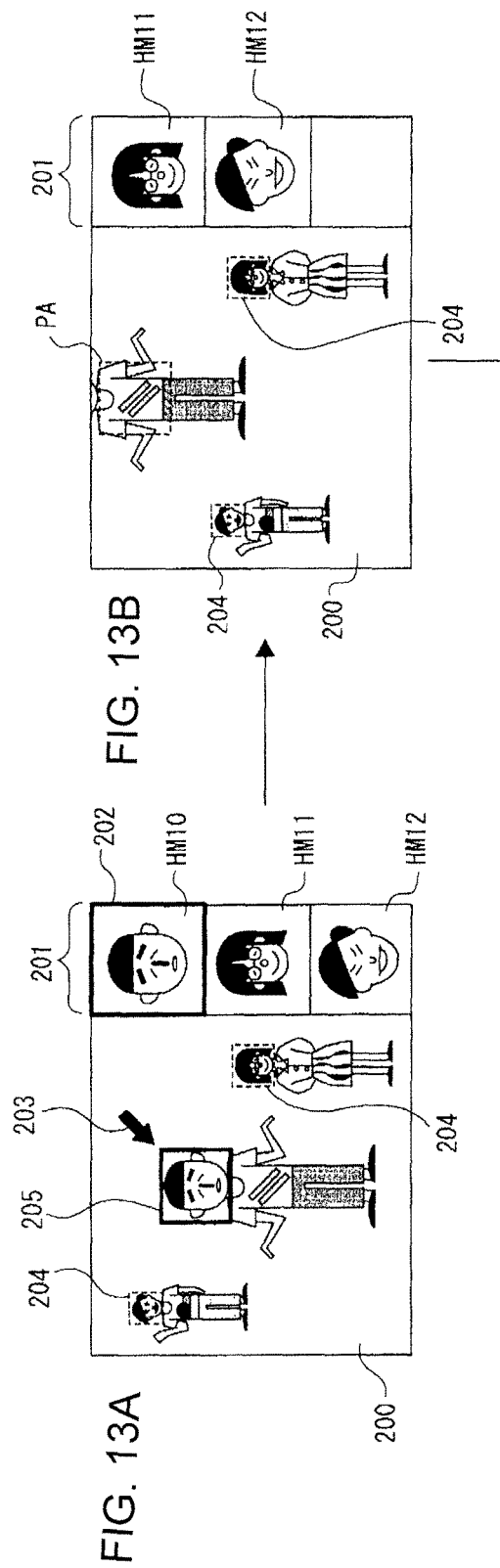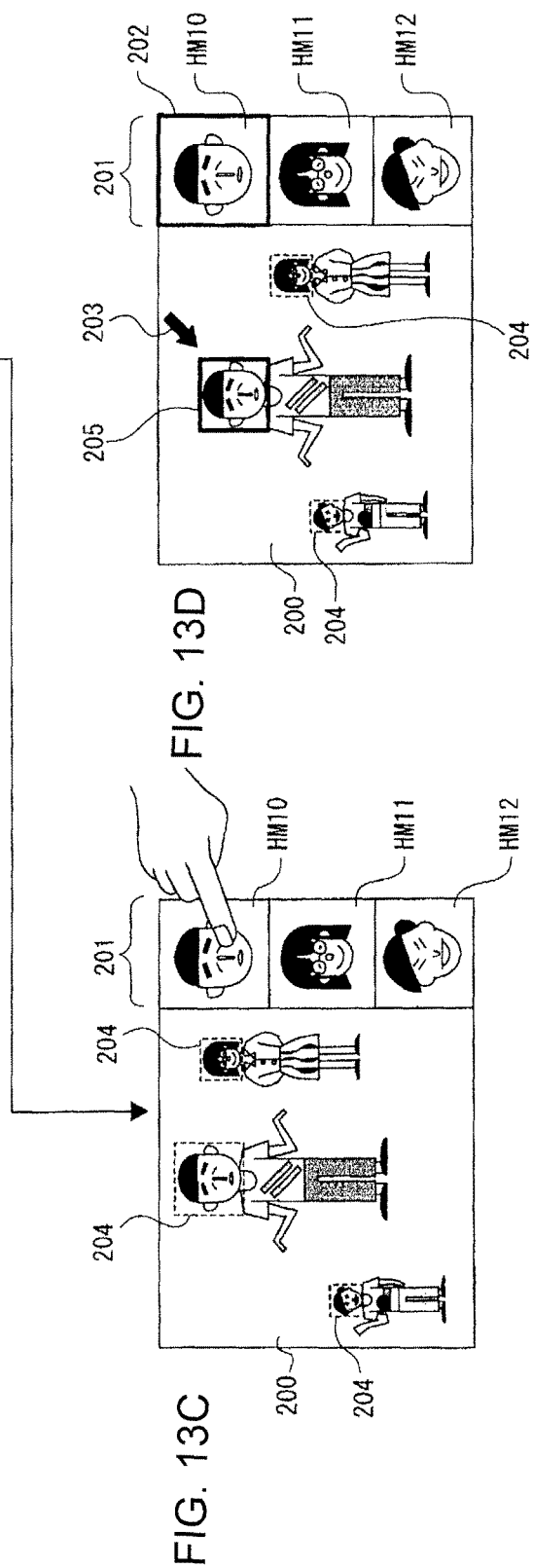

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2013-038795 filed Feb. 28, 2013, the entire contents of which are incorporated herein by reference.

TECHNICAL FIELD

The present technology relates to an image processing apparatus that performs a process of allowing a user to easily recognize an object in an image, an image processing method, and a program.

BACKGROUND ART

Recent digital still cameras and digital video cameras normally have a facial detection function, and have a function of optimally matching various parameters (focus, brightness and the like) of the camera according to facial position and area. Moreover, in recent years, a function of identifying individuals is also provided, and when there are a plurality of persons, a function of identifying whether there is a desired person registered in advance and preferentially matching various parameters (focus, brightness and the like) with the identified desired person is also provided.

For this individual identification technology, research into a facial image in specific capturing conditions (a frontal face, lighting, a large face and the like) having assumed a security field and the like has been actively conducted, and in an advanced research field, there are a plurality of technologies having a very highly accurate identification ability, and these technologies have been provided in security-based products for commercial use.

Patent Literature 1 discloses a technology related to individual identification.

Patent Literature 2 discloses a technology for performing facial recognition, and expanding and displaying a facial image.

CITATION LIST

Patent Literature

[PTL 1]
JP 2012-198781A
[PTL 2]
Japanese Patent No. 4794584

SUMMARY

Technical Problem

However, in an imaging opportunity of a still image and a moving image by a general user, an opportunity for reproducing a captured image, and the like, there are cases in which it is difficult to recognize an object to be particularly focused. For example, in the case of performing video capturing in a sporting event in an elementary school, a user recognizes an object through a finder or a monitor display and performs capturing on the object. However, in many cases, since a user does not recognize his/her child among many children, the user may not successfully perform the capturing or may miss out on a scene to be captured.

In view of the above, for example, when the aforementioned individual identification technology is applied, it is possible to track a specific person in an image and to allow a user to easily find his/her child in an object. However, actually, in order to achieve the individual identification technology, a high processing ability is necessary for an arithmetic operation device; therefore, it is difficult to provide the individual identification technology in consumer appliances.

Furthermore, even when the individual identification technology is provided, facial images which are captured in a use case of a consumer video camera or digital camera, in other words, in an everyday captured scene, include many facial images having a high degree of technical difficulty as compared with the specific capturing conditions (a small image, shielding, a shadow, a non-frontal face and the like). For this reason, it is difficult to accurately perform the individual identification.

Therefore, in the present technology, it is desirable to allow a user to easily find an object to be focused in an image using a simpler technique without using an individual identification technology.

According to an embodiment of the present disclosure, an information processing apparatus may include a control device to: generate display data including a main image for display in a first area of a display area and a list of candidate images for display in a second area of the display area at a same time the main image is displayed in the first area, wherein the candidate images are extracted from and represent respective objects in the main image; and receive an input from a user to select one candidate image from the list, wherein the display data is generated based on selection of the one candidate image.

According to an embodiment of the present disclosure, an information processing method may include generating, by a control device, of display data including a main image for display in a first area of a display area and a list of candidate images for display in a second area of the display area at a same time the main image is displayed in the first area, wherein the candidate images are extracted from and represent respective objects in the main image; and receiving an input from a user to select one candidate image from the list, wherein the display data is generated based on selection of the one candidate image.

According to an embodiment of the present disclosure, a non-transitory recording medium may be recorded with a program executable by a computer, and the program may include generating of display data including a main image for display in a first area of a display area and a list of candidate images for display in a second area of the display area at a same time the main image is displayed in the first area, wherein the candidate images are extracted from and represent respective objects in the main image; and receiving an input from a user to select one candidate image from the list, wherein the display data is generated based on selection of the one candidate image.

In this way, it is possible to recognize selection candidate images and realize an emphasis display of a candidate presentation image corresponding to a selected candidate presentation image.

A program according to an embodiment of the present technology is a program causing an arithmetic operation processing apparatus to perform each processing of the above-described image processing method.

Advantageous Effects of Invention

According to the present technology, an effect that it is possible to allow a user to quickly and easily find an object to be focused in an image is obtained.

BRIEF DESCRIPTION OF DRAWINGS

FIGS. 2A and 2B are flowcharts of processing of an image processing apparatus according to an embodiment.

FIGS. 13A to 13D are explanatory diagrams of a display example corresponding to a tracking process according to a third embodiment.

DESCRIPTION OF EMBODIMENTS

Hereinafter, the embodiment will be described in the following order.
<1. Configuration and processing example of image processing apparatus according to embodiment>
<2. Configuration of imaging apparatus>
<3. Example of emphasis display of candidate presentation image and selected object>
<4. Processing example of first embodiment as imaging apparatus>
<5. Processing example of second embodiment as imaging apparatus>
<6. Processing example of third embodiment as imaging apparatus>
<7. Processing example of fourth embodiment as imaging apparatus>
<8. Application to reproduction apparatus>
<9. Application to program and computer apparatus>
<10. Modification example>

Figure 1:
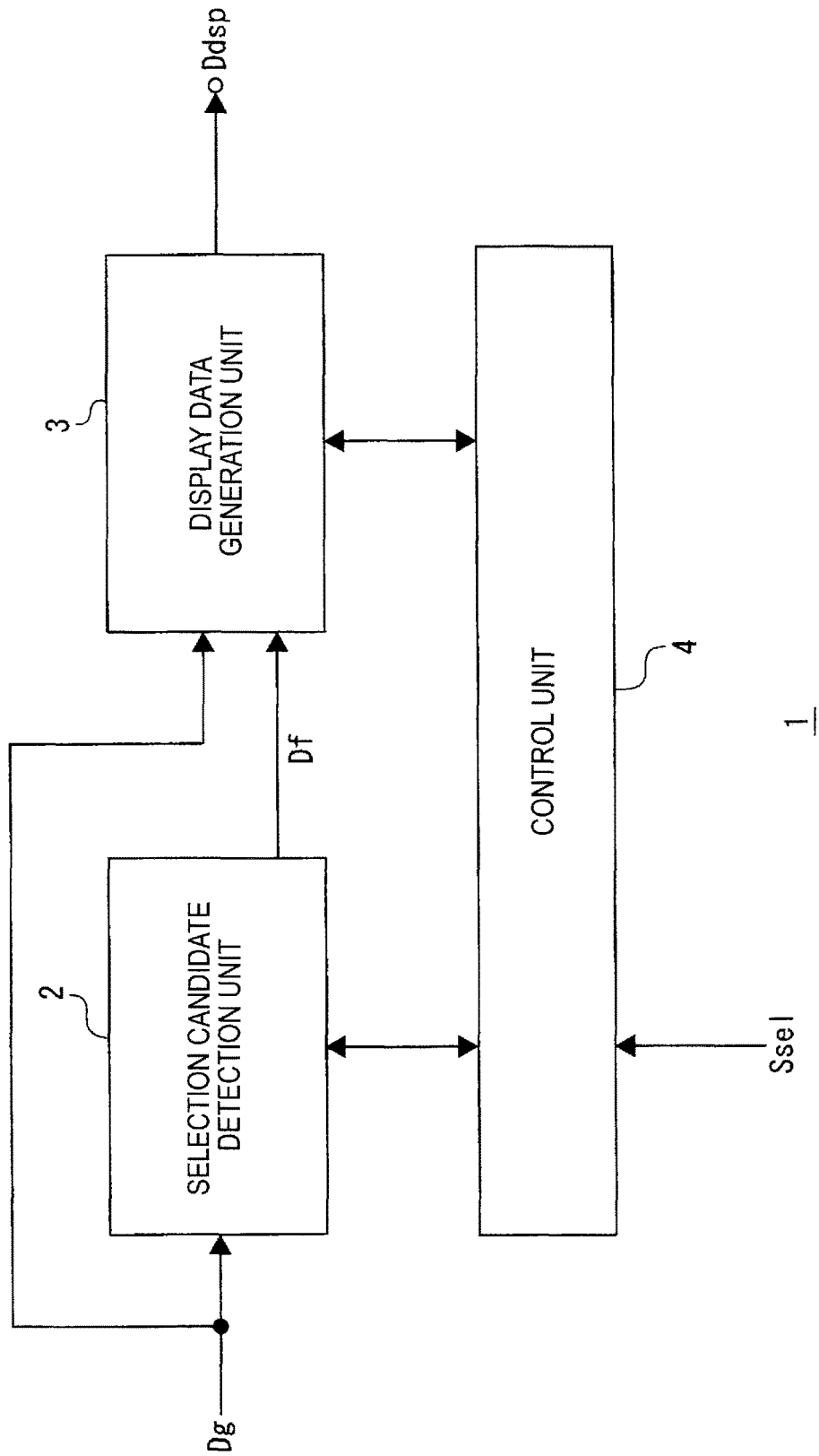
FIG. 1 is a block diagram of an image processing apparatus according to an embodiment of the present technology.

1. Configuration and Processing Example of Image Processing Apparatus According to Embodiment FIG. 1 illustrates a configuration example of an image processing apparatus 1 according to an embodiment.

The image processing apparatus 1 includes a selection candidate detection unit 2, a display data generation unit 3, and a control unit 4.

The selection candidate detection unit 2 performs a process of detecting a selection candidate image as an object image in a main image serving as a moving image or a still image.

Moving image data or still image data is supplied to the selection candidate detection unit 2 as image data Dg. The image data Dg, for example, includes captured image data captured by an imaging apparatus, reproduction image data reproduced by a reproduction apparatus from a recording medium, reception image data received in a reception apparatus, and the like. In addition, the still image data is frame image data corresponding to one frame, and the moving image data is a frame image data group based on a plurality of temporally continuous frames. Furthermore, the input image data Dg is a main image that is used in display output.

The selection candidate detection unit 2 detects a selection candidate image in the image data Dg. In a description of the embodiment, the selection candidate image is assumed to be a "facial image" as an example. The selection candidate detection unit 2 detects a facial image in the frame image data and sets the facial image as a selection candidate image Df.

The display data generation unit 3 performs a process of generating display data Ddsp using the image data Dg that is a main image. The display data Ddsp output from the display data generation unit 3 is supplied to a display apparatus (not illustrated), is displayed as an image, and is seen by a user.

The control unit 4 allows the display data generation unit 3 to combine the selection candidate image Df detected by the selection candidate detection unit 2 with the image data Dg (the main image), and to generate the display data Ddsp including a candidate presentation image. In this way, the display apparatus (not illustrated) performs display in which the candidate presentation image is superimposed on the main image, for example.

In addition, the candidate presentation image is an image for clearly presenting one or a plurality of selection candidate images (facial images), and for example, includes an image of a facial list, in which facial images are arranged, and the like. For example, FIG. 4B illustrates an example of a facial list 201, which will be described later.

Figure 5A:
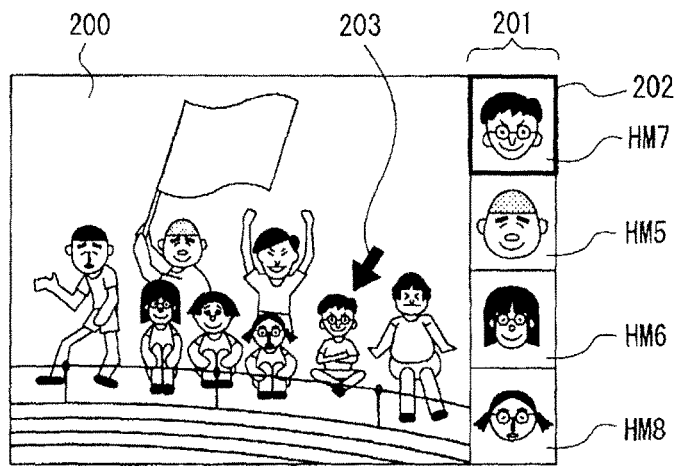
FIGS. 5A to 5C are explanatory diagrams of a display state according to an embodiment.

Furthermore, the control unit 4 monitors selection operation information Ssel of a user. When a selection operation of a user is performed for the candidate presentation image (for example, a facial list), the control unit 4 allows the generation of display data, which includes display in which an object image corresponding to a selected candidate presentation image is emphasized in the main image (the image data Dg). That is, the control unit 4 allows display, in which a face selected by a user from the facial list is clearly presented to the user on the main image, to be performed on a display image based on the image data Dg. For example, FIG. 5A illustrates an example in which an image (a face) in a main image 200 corresponding to a selection candidate selected from the facial list 201 is emphasized in an indicator 203, which will be described later.

In addition, the image processing apparatus 1 including the selection candidate detection unit 2, the display data generation unit 3, and the control unit 4 can be realized by a CPU (Central Processing Unit) or a DSP (Digital Signal Processor) as an arithmetic operation device.

Furthermore, for example, the function of the control unit 4 is considered to be realized by a CPU and the like, and the functions of the selection candidate detection unit 2 and the display data generation unit 3 are considered to be realized by a DSP and the like connected to the CPU or as cooperation processing thereof.

A processing example of the image processing apparatus 1 will be described in FIG. 2.

FIG. 2A illustrates processing corresponding to the input of frame image data Dg continuous as moving image data when image data Dg is the moving image data. While the input of frame image data continues, the procedure proceeds from steps F1 to F2.

The selection candidate detection unit 2 receives image data Dg of one frame in step F2 and detects a selection candidate image in step F3. For example, the selection candidate detection unit 2 analyzes whether there are facial images in one frame as a main image through face recognition processing, and when one or a plurality of facial images are present, the selection candidate detection unit 2 sets the facial images as a selection candidate image Df.

A process of step F4 is branched according to whether a user has selected the selection candidate image (during selection). In a period in which selection is not made, the procedure proceeds to step F5.

In step F5, the generation and output of display data including the candidate presentation image are performed. That is, the control unit 4 allows the display data generation unit 3 to combine the image data Dg of one frame as a main image with the selection candidate image Df, and to generate display data Ddsp in which the selection candidate image Df, for example, is a candidate presentation image arranged as the facial list. Then, the display data generation unit 3 outputs the display data Ddsp to a display apparatus (not illustrated).

Then, in a period until a selection operation is performed by the user, the procedure returns to step F1 from step F6. Accordingly, steps F2, F3, and F5 are performed for each piece of frame image data Dg that is sequentially input. In this way, on the display apparatus, an image in which the candidate presentation images (the facial list) are superimposed on a main image as a moving image is displayed. The user is able to see the facial list and select an object to be focused.

In step F6, the control unit 4 monitors a selection operation of the user. When it is detected that the user performs the selection operation, the control unit 4 allows the procedure to proceed from step F6 to step F7, and instructs the display data generation unit 3 to generate and output display data in which the selected object image is emphasized. The display data generation unit 3 generates and outputs an image in which the position of the selected object is prominently presented on the main image after the frame image data Dg at that time. In addition, when the display data is generated in step F7, the superimposition of the candidate presentation images (the facial list) may be continuously performed, or the facial list may not be superimposed and the display of the facial list may not be performed.

In a period in which the selection is made, the procedure proceeds to step F7 from step F4, and this process is repeated.

Accordingly, after the selection operation of the user, an image in which the object to be focused by the user is emphasized through a technique such as an indicator or emphasis display is displayed on the main image, so that the user is able to recognize the position of the target object in the image at a glance.

In addition, when there is a cancellation operation in a selection state, since the process of step F7 is not performed until there is a next selection operation, the emphasis display is ended and the display in which the facial list is superimposed on the main image is performed by the process of F5.

Further, when the input of the frame image data ends, the process of FIG. 2A ends.

FIG. 2B illustrates a processing example when a still image has been input as the image data Dg. FIG. 2B illustrates processing corresponding to the input of image data Dg of one frame as still image data.

The selection candidate detection unit 2 receives image data Dg of one frame in step F10 and detects a selection candidate image in step F11. Then, for example, the selection candidate detection unit 2 analyzes whether there are facial images in the image data Dg through face recognition processing, and when one or a plurality of facial images are present, the selection candidate detection unit 2 sets the facial images itself as a selection candidate image Df.

In step F12, the generation and output of display data including the selection candidate image are performed. That is, the control unit 4 allows the display data generation unit 3 to combine the image data Dg of one frame as a main image with the selection candidate image Df, and to generate display data Ddsp in which the selection candidate image Df, for example, is a candidate presentation image arranged as the facial list. Then, the display data generation unit 3 outputs the display data Ddsp to the display apparatus (not illustrated). In this way, display in which the facial list is superimposed on the still image is performed on the display apparatus.

In step F13, the control unit 4 monitors a selection operation of the user. When it is detected that the user performs the selection operation, the control unit 4 allows the procedure to proceed to step F14, and instructs the display data generation unit 3 to generate and output display data in which the selected object image is emphasized. Accordingly, the display data generation unit 3 generates display data as an image in which the position of the selected object is prominently presented on the main image (the image data Dg) as a still image, and outputs the display data to the display apparatus.

In this way, an image, in which the object to be focused by the user is emphasized through a technique such as an indicator or emphasis display is displayed on the displayed still image.

As described above, in the image processing apparatus 1, for example, the facial image and the like are detected as the selection candidate image in the main image as the moving image or the still image and the selection candidate image is combined with the main image to generate the display data, so that it is possible to easily recognize the selection candidate image on the display. Then, the user performs a selection operation for the selection candidate image, so that the object image corresponding to the selected selection candidate image is emphasized on the main image and is prominently presented. Accordingly, an effect that it is possible to quickly and easily find an object to be focused by a user from an image is obtained. Furthermore, in this way, an effect that stress of a user is reduced is also obtained. The processing example of the image processing apparatus 1 is considered to be variously modifiable similarly in each embodiment to be described later.

2. Configuration of Imaging Apparatus

Hereinafter, the configuration and operation (candidate presentation image display and emphasis display) of an imaging apparatus 10 in which the image processing apparatus 1 is embedded will be described in detail as an example.

Figure 3:
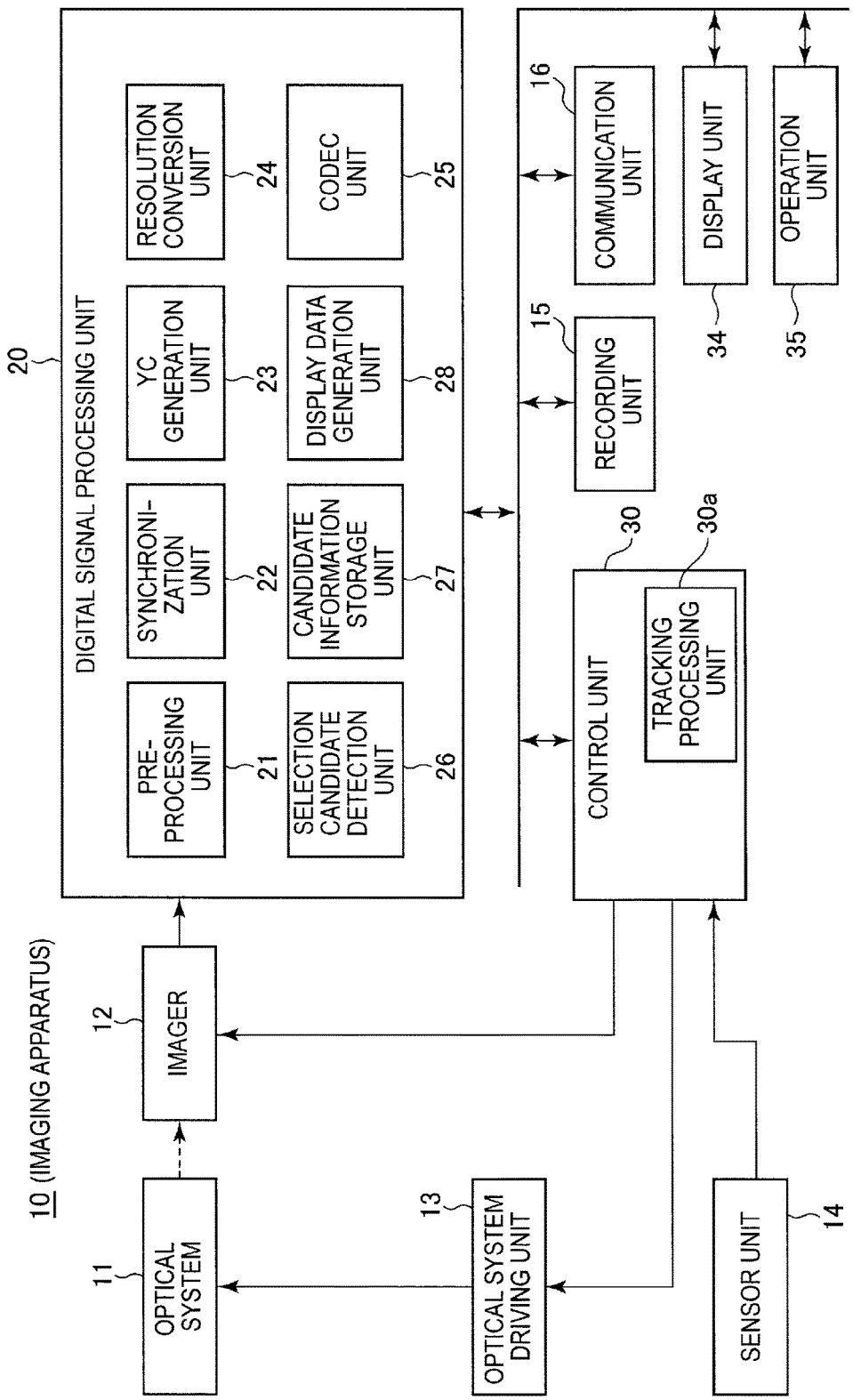
FIG. 3 is a block diagram of an imaging apparatus according to an embodiment.

FIG. 3 illustrates a configuration example of the imaging apparatus 10 according to the embodiment.

The imaging apparatus 10 is a so-called digital still camera or digital video camera, is an appliance that performs the capturing and recording of a still image or a moving image, and has an image processing apparatus according to an embodiment embedded therein. The imaging apparatus 10 performs candidate presentation image display and emphasis display in moving image display as a so-called monitoring image (an object monitoring image).

Furthermore, an example in which a facial image is set as a selection candidate image, and an example in which a facial list is displayed as a candidate presentation image are employed.

As illustrated in FIG. 3, the imaging apparatus 10 includes an optical system 11, an imager 12, an optical system driving unit 13, a sensor unit 14, a recording unit 15, a communication unit 16, a digital signal processing unit 20, a control unit 30, a display unit 34, and an operation unit 35.

The optical system 11 has lenses such as a cover lens, a zoom lens, or a focus lens and a throttle mechanism. By this optical system 11, light from an object is collected in the imager 12.

The imager 12, for example, has a CCD (Charge Coupled Device) type or CMOS (Complementary Metal Oxide Semiconductor) type imaging element.

The imager 12, for example, performs CDS (Correlated Double Sampling) processing, AGC (Auto Gain Control) processing and the like for an electrical signal obtained through photoelectric conversion in the imaging element, and further performs A/D (Analog/Digital) conversion processing. Then, the imager 12 outputs an imaging signal as digital data to the digital signal processing unit 20 of a rear stage.

The optical system driving unit 13 drives the focus lens of the optical system 11 and performs a focus operation under the control of the control unit 30. Furthermore, the optical system driving unit 13 drives the throttle mechanism of the optical system 11 and performs exposure adjustment under the control of the control unit 30. Moreover, the optical system driving unit 13 drives the zoom lens of the optical system 11 and performs a zoom operation under the control of the control unit 30.

The digital signal processing unit 20, for example, is configured as an image processing processor by a DSP and the like. The digital signal processing unit 20 performs various types of signal processing for a digital signal (captured image data) from the imager 12.

For example, the digital signal processing unit 20 includes a pre-processing unit 21, a synchronization unit 22, a YC generation unit 23, a resolution conversion unit 24, a codec unit 25, a selection candidate detection unit 26, a candidate information storage unit 27, and a display data generation unit 28.

The pre-processing unit 21 performs clamp processing of clamping a black level of R, G, and B to a predetermined level, or correction processing among color channels of R, G, and B with respect to the captured image data from the imager 12.

The synchronization unit 22 performs demosaic processing such that image data for each pixel has color components of all of R, G, and B.

The YC generation unit 23 generates (separates) a luminance (Y) signal and a color (C) signal from the image data of R, G, and B.

The resolution conversion unit 24 performs resolution conversion processing on the image data on which various types of signal processing have been performed.

The codec unit 25, for example, performs coding processing for recording or communication with respect to the image data for which the resolution conversion has been performed.

The selection candidate detection unit 26, for example, performs image analysis processing of each frame unit (or each intermittent frame) for the captured image data (the luminance signal/the color signal) obtained in the YC generation unit 23, and extracts a selection candidate image. That is, the selection candidate detection unit 26 performs facial image detection for image data continuously input on a time axis, and extracts the selection candidate image.

The facial detection, for example, can be performed through a technique such as pattern matching in image analysis for the captured image data. In addition, employing the facial image as the selection candidate image is for illustrative purposes only. Another example will be described later as a modification example.

The selection candidate detection unit 26 detects the facial image and extracts an image area in which the facial image is located. An image of the extracted image area, for example, an image of an area shaped like a rectangular frame, is employed as the selection candidate image.

Furthermore, the selection candidate detection unit 26 generates position information (for example, information and the like on x and y coordinates on a screen, and an object distance) of the image area (a frame area surrounding a face) and frame size information (for example, the width, height, number of pixels and the like of a frame) with respect to the extracted selection candidate image.

Furthermore, the selection candidate detection unit 26 is also able to perform attribute detection for the selection candidate image. For example, the selection candidate detection unit 26 identifies attributes for an object employed as the selection candidate image through the image analysis, and generates attribute information. The attribute information, for example, is information indicating whether the object employed as the selection candidate image is an adult or a child, or information indicating whether the object is a female or a male. Moreover, information on a more detailed age group and the like may be discriminated. The selection candidate detection unit 26, for example, is able to discriminate a feature point of the facial image and determine a sex or an age group.

In addition, the selection candidate detection unit 26 may perform equalization processing or outlier removal processing for the image and generate information on a candidate image.

The information on a candidate image is handed over to the control unit 30. Furthermore, the selection candidate image and the information on the selection candidate image are stored in the candidate information storage unit 27.

The candidate information storage unit 27 stores the detection result of the selection candidate detection unit 26 under the control of the control unit 30. In detail, the image data itself of the frame which is the selection candidate image and the information on the selection candidate image are stored. The information on the selection candidate image includes an identifier (ID) assigned to each selection candidate image by the control unit 30, the position information, the size information, the attribute information, and the like.

The display data generation unit 28 generates display data as, for example, a monitoring image, which is output to the display unit 34 under the control of the control unit 30.

The display data which is a monitoring image basically includes data of each frame as the captured image data (the main image) for which the resolution conversion has been performed by the resolution conversion unit 24. In a period in which a function (hereinafter referred to as an "emphasis display function") of performing an operation of candidate presentation image display and emphasis display is turned on, the display data generation unit 28 generates display data for monitoring image display based on the main image (the captured image data). The display data is supplied to the display unit 34, so that the monitoring image display is performed. When the emphasis display function is turned on, the display data generation unit 28 performs a process of superimposing the selection candidate image data stored in the candidate information storage unit 27 on the main image and generating display data including a facial list as candidate presentation images according to an instruction of the control unit 30. This display data is supplied to the display unit 34, resulting in the display of an image in which the candidate presentation images (the facial list) are superimposed on the monitoring image.

Furthermore, in the period in which the emphasis display function is turned on, the display data generation unit 28 performs a process of generating display data in which an object selected in the main image is emphasized and displayed according to an instruction of the control unit 30 corresponding to user selection. This display data is supplied to the display unit 34, resulting in the display of an image in which a selected object is clearly recognizable in the monitoring image.

In addition, each of the selection candidate detection unit 26, the candidate information storage unit 27, and the display data generation unit 28 is illustrated as a functional configuration that is performed in the digital signal processing unit 20 in the example of FIG. 3. However, this is for illustrative purposes only. The processes of the selection candidate detection unit 26, the candidate information storage unit 27, and the display data generation unit 28 may be performed by the control unit 30.

The control unit 30 is configured by a micro computer (an arithmetic processing device) including a CPU, a ROM (Read Only Memory), a RAM (Random Access Memory), a flash memory and the like.

The CPU executes programs stored in the ROM, the flash memory and the like, thereby generally controlling the entire imaging apparatus 10.

The RAM is a work area at the time of various types of data processing of the CPU, and is used to temporarily store data, programs and the like.

The ROM and the flash memory (a nonvolatile memory) are used to store application programs for various operations, firmware and the like, in addition to an OS (Operating System) for allowing the CPU to control each element, and content files such as image files. Particularly, in the present example, a program for performing processing for the emphasis display function, which will be described later, is also stored.

Such a control unit 30 controls operations of each necessary element with respect to an instruction of various types of signal processing in the digital signal processing unit 20, a capturing operation and a recording operation corresponding to a user operation, a reproduction operation of a recorded image file, a camera operation of zoom, focus, exposure adjustment and the like, a user interface operation and the like.

Furthermore, in the case of the present embodiment, the control unit 30 has a function of a tracking processing unit 30a, and also performs object tracking processing, which is necessary for the emphasis display function, in processing in first to fifth embodiments to be described later. In detail, the control unit 30 performs a process of tracking each object extracted as a selection candidate image in each frame constituting a moving image and determining whether the objects coincide with one another among the frames, and performs a process of tracking a selected object.

In addition, the tracking processing unit 30a may also be realized as the function of the digital signal processing unit 20.

The display unit 34 is a display unit that performs various types of display for a user (a capturer and the like), and for example, is formed using a display device, such as an LCD (Liquid Crystal Display) or an organic EL (Electro-Luminance) display, which is formed on a housing of the imaging apparatus 10. In addition, the display unit 34 may be formed using the LCD or the organic EL display in a so-called view finder form.

This display unit 34 includes the display device and a display driver that allows the display device to perform display. The display driver allows various types of display to be performed on the display device based on the instruction of the control unit 30. For example, the display driver reproduces and displays a still image or a moving image captured and recorded in the recording medium, or displays a monitoring image as a moving image based on captured image data of each frame, which is captured during release (a shutter operation) standby, on a screen of the display device in response to the display data from the display data generation unit 28. Furthermore, the display driver allows various operation menus, icons, messages and the like, that is, a GUI (Graphic User Interface), to be displayed on the screen. In the case of the present embodiment, for example, display corresponding to the emphasis display function is also performed on the monitoring image.

The operation unit 35 has an input function of receiving a user operation, and sends a signal corresponding to the input operation to the control unit 30.

The operation unit 35, for example, is realized by various operators provided on the housing of the imaging apparatus 10, a touch panel formed on the display unit 34, and the like.

As the operator of the housing, a reproduction menu start button, a decision button, an arrow key, a cancellation button, a zoom key, a slide key, a shutter button (a release button) and the like are provided.

Furthermore, by a touch panel operation using the touch panel and the icons and menus displayed on the display unit 34, various operations may be possible.

The recording unit 15, for example, includes a nonvolatile memory, and serves as a storage area for storing image files (content files) such as still image data or moving image data, attribute information of the image files, thumbnail images and the like.

The image files, for example, are stored in the form of a JPEG (Joint Photograph Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) detachable to the imaging apparatus 10 and a card recording reproduction unit that performs recording reproduction access to the memory card. Furthermore, the recording unit 15 may be realized in the form of an HDD (Hard Disk Drive) and the like that is embedded in the imaging apparatus 10.

Furthermore, in the present example, a program for performing a process for the emphasis display function may be stored in the recording unit 15.

The communication unit 16 performs data communication or network communication with an external device in a wired or wireless manner.

For example, the communication unit 16 performs communication of the captured image data (the still image files or the moving image files) with an external display apparatus, a recording apparatus, a reproduction apparatus and the like.

Furthermore, as a network communication unit, the communication unit 16, for example, may perform communication through various networks, such as the Internet, a home network, or a LAN (Local Area Network), or perform various types of data transmission and reception with a server, a terminal and the like on the network.

The sensor unit 14 comprehensively indicates various sensors. For example, the sensor unit 14 is provided with a gyro sensor (an angular velocity sensor), an acceleration sensor and the like for detecting a motion of the entire imaging apparatus 10, such as shake, or a posture and movement (panning movement, tilt movement and the like) of the imaging apparatus 10.

Furthermore, the sensor unit 14 may be provided with an illuminance sensor for detecting external illuminance for exposure adjustment and the like, and further a distance measurement sensor for measuring an object distance.

Furthermore, as the sensor unit 14, a zoom lens position sensor for detecting the position of the zoom lens in the optical system 11, and a focus lens position sensor for detecting the position of the focus lens are provided in some cases.

Furthermore, as the sensor unit 14, a sensor for detecting an aperture amount of a mecha-iris (a throttle mechanism) may be provided in some cases.

Various sensors of the sensor unit 14 transfer detected information to the control unit 30. The control unit 30 is able to perform various types of control using the information detected by the sensor unit 14.

In such an imaging apparatus 10, elements of the image processing apparatus 1 as described in FIG. 1 are as follows.

Configurations corresponding to the selection candidate detection unit 2, the display data generation unit 3, and the control unit 4 in the image processing apparatus 1 of FIG. 1 are mounted as the selection candidate detection unit 26, the candidate information storage unit 27, the display data generation unit 28, and the control unit 30.

3. Example of Emphasis Display of Candidate Presentation Image and Selected Object Hereinafter, a detailed display example of the emphasis display function will be described with reference to FIG. 4 and FIG. 5. Each of FIG. 4 and FIG. 5 shows examples of images displayed on the display unit 34.

Figure 4A:
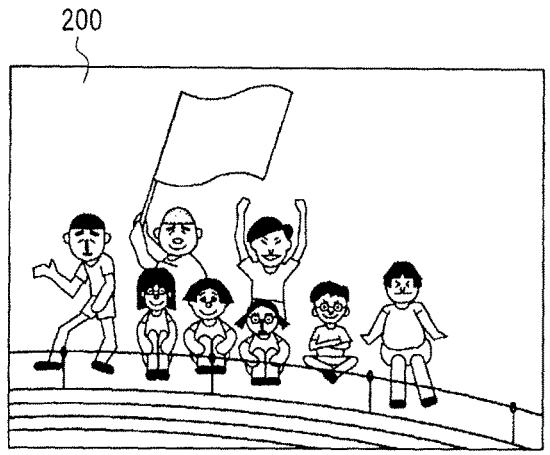
FIGS. 4A to 4C are explanatory diagrams of a display state according to an embodiment.
Figure 4B:
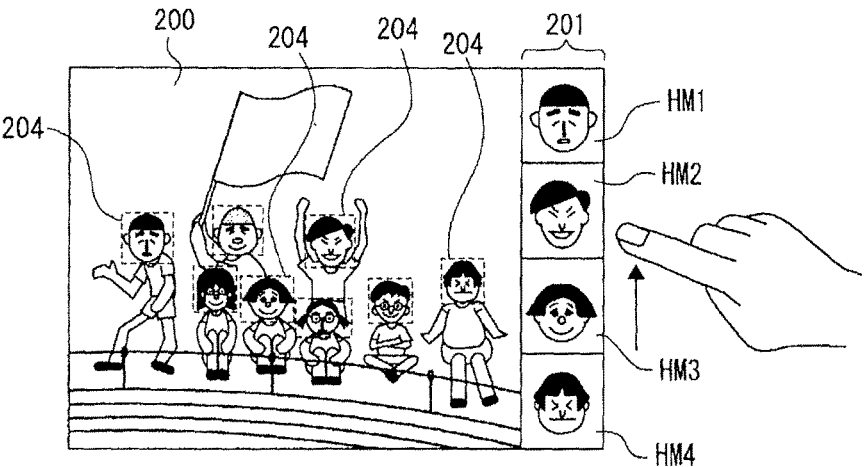

FIG. 4A is an example in which a monitoring image is displayed as a main image 200. For example, a user (a capturer) has the imaging apparatus 10 directed at students at a sporting event.

When the emphasis display function is turned on, a candidate presentation image 201 (hereinafter, also written as a "facial list 201") is superimposed on the monitoring image as the main image 200 and displayed as illustrated in FIG. 4B.

For example, when faces of eight persons are detected from captured image data as selection candidate images, facial images of the eight persons are arranged to be displayed as the facial list 201. However, due to the limitation of a display area, FIG. 4B illustrates an example in which four facial images are arranged to be vertically displayed.

A user performs a predetermined operation (for example, a page turning operation or a scroll operation) for the facial list 201, so that it is possible to advance display on the screen. For example, on the facial list 201 of FIG. 4B, facial images of persons HM1, HM2, HM3, and HM4 are displayed. However, a user performs a scroll operation on the touch panel, so that it is possible to display facial images of persons HM5, HM6, HM7, and HM8 as illustrated in FIG. 4C.

Figure 4C:
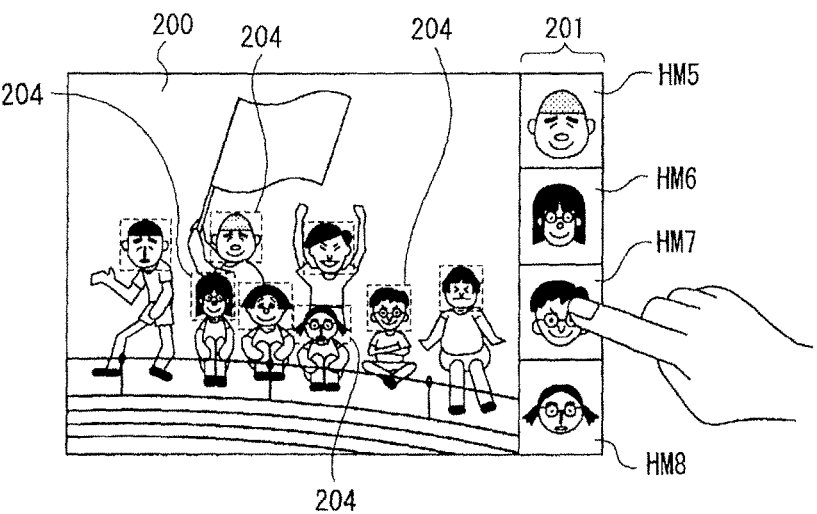

In addition, in the examples of FIG. 4B and FIG. 4C, frame display 204 (indicated by dotted frames in FIG. 4B and FIG. 4C) indicating facial image parts employed as the selection candidate images are displayed. Facial images of areas indicated by the frame display 204 are arranged and displayed on the facial list 201.

However, the frame display 204 of the selection candidate images on the main image 200 may not be performed.

The facial images of the facial list 201 are displayed with resized shapes such that image data of actual facial image areas extracted from the main image 200 is expanded or reduced with a predetermined size. For example, since facial images captured small in the main image 200 are resized to a size that is easy to see to a certain degree, a facial image of each person is displayed with the almost the same size. Accordingly, on the facial list 201, each person can be easily recognized by a user.

A user is able to select a person on whom to focus from the facial list 201. For example, it is assumed that the user finds his/her child (the person HM7) from the facial list 201 and performs a touch operation for selecting the person HM7 as illustrated in FIG. 4C.

In response to this selection operation, display in which the selected object is emphasized on the main image 200 is performed.

Figure 5B:
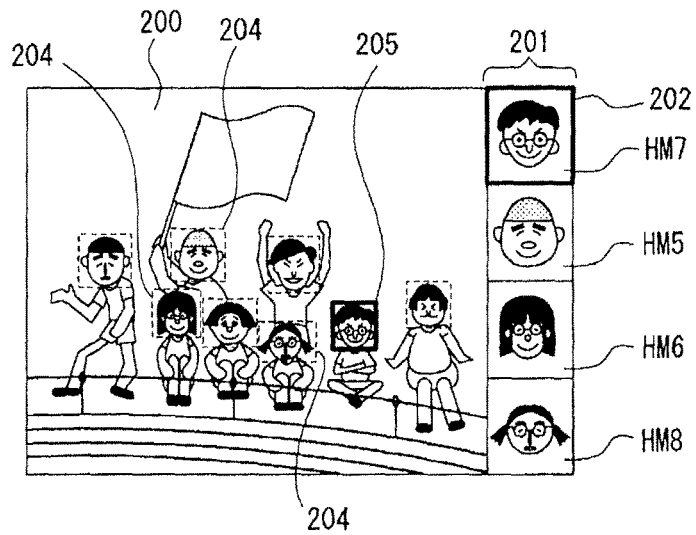
Figure 5C:
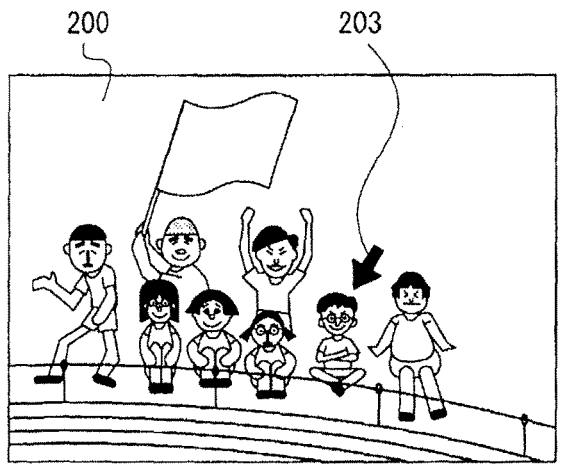

Each of FIG. 5A, FIG. 5B, and FIG. 5C is an example in which an object image (an image of the person HM7) corresponding to the selected facial image is emphasized for display.

FIG. 5A is an example in which the indicator 203 indicating the position of the object is displayed on the main image 200 in response to a selection operation, so that the object is emphasized on the main image 200. The indicator 203 is indicated by an arrow mark in FIG. 5A. However, it goes without saying that the shape, color and size of the indicator 203 can be variously considered. Furthermore, the indicator 203 can also be considered to be flickered or displayed with high luminance.

Furthermore, in the example of FIG. 5A, the facial list 201 is continuously displayed after the selection, and the selected object is emphasized on the facial list 201. In detail, the facial image of the selected person HM7 is changed to the first (the top) position in an order of the facial list 201. That is, an order of the facial images on the displayed facial list 201 is changed from an order of the persons HM5, HM6, HM7, and HM8 of FIG. 4C to an order of the persons HM7, HM5, HM6, and HM8. Moreover, on the facial list 201, the facial image of the person HM7 is made more noticeable than the other facial images. FIG. 5A illustrates an example in which a thick line list frame 202 is employed. However, various display modes, such as highlight display, change in a background color or a list frame, or flickering, are assumed.

In the example of FIG. 5B, when the frame display 204 is performed for each selection candidate image on the main image 200, a special frame display 205 is performed for a corresponding object in response to a selection operation. In FIG. 5B, the special frame display 205 is a thick frame and other frame display 204 is a dotted line frame. It is sufficient if the special frame display 205 is a display mode that is clearly distinguishable from the other frame display 204.

In addition, after selection, the frame display 204 of other selection candidate images may be ended. Furthermore, before the selection, the frame display 204 may not be performed, and after the selection, the frame display 204 and the special frame display 205 may be performed.

The mode of the emphasis display in the facial list 201 is similar to FIG. 5A.

FIG. 5C is an example in which the display of the facial list 201 is ended in response to a selection operation. Also, FIG. 5C is an example in which the indicator 203 indicating the position of a corresponding object is displayed on the main image 200, so that the object is emphasized.

After selection, an example of emphasizing the corresponding object can be variously considered. Examples of this are largely classified into emphasis on the main image 200 and emphasis on the facial list 201.

In the emphasis on the main image 200, in addition to the indicator 203 and the special frame display 205, there is a technique for performing high luminance display or flickering display for a corresponding facial image itself, allowing only the corresponding facial image to be colored and the other facial images to be monochrome or shaded, or changing a hue of only the corresponding facial image relative to the other facial images. Furthermore, the corresponding facial image may be expanded to an appropriate size in the main image. In any case, it is sufficient if the facial part of a selected person is displayed on the main image 200 to be clearly recognized by a user. By this emphasis display, a user is able to instantaneously find an object to be focused from the screen of the imaging apparatus 10, and to easily capture the object.

Furthermore, when the facial list 201 is displayed after the selection, it is preferable to perform emphasis by changing an order on the list or allowing a list image or a list frame to be different from another. In this way, a user is able to recognize a facial image selected once, and a selection error and the like are easily checked.

4. Processing Example of First Embodiment as Imaging Apparatus

A first embodiment as a processing example for performing the emphasis display as described above will be described with reference to FIG. 6 and FIG. 7. The first embodiment employs an example in which the facial list 201 is continuously displayed after the selection operation as illustrated in FIG. 5A and FIG. 5B.

Figure 6:
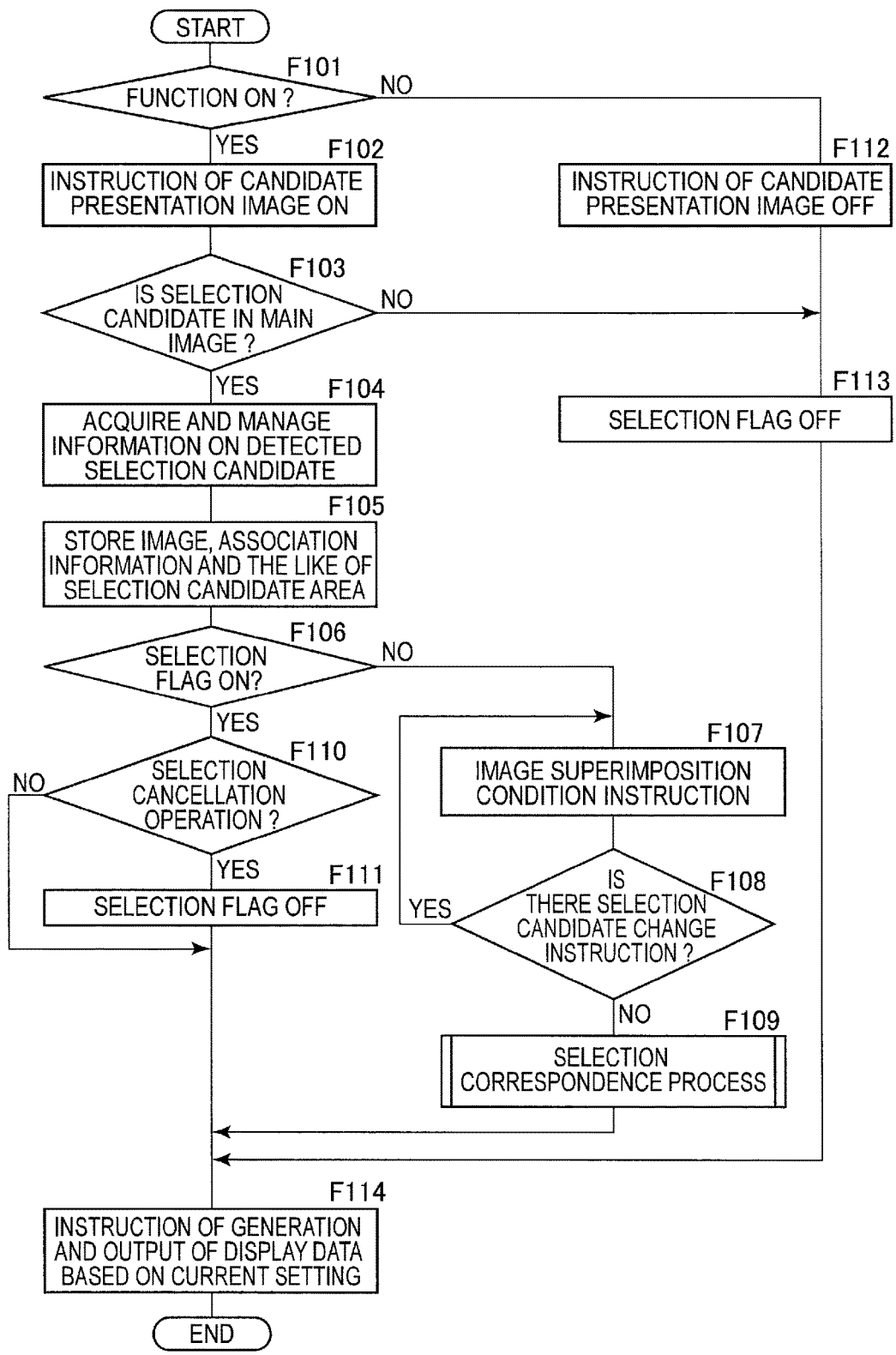
FIG. 6 is flowchart of a display control process according to a first embodiment.

FIG. 6 is a flowchart of processing of the control unit 30 for the emphasis display in a period in which monitoring image display is performed in the imaging apparatus 10. The control unit 30, for example, performs the processes of FIG. 6 corresponding to each frame as the captured image data.

The control unit 30 checks whether the emphasis display function is turned on in step F101. It is sufficient if on/off of the emphasis display function, for example, is settable by a user. However, the control unit 30 may automatically perform on/off setting in response to a capturing mode or other conditions.

When the emphasis display function is turned off, the control unit 30 transmits an instruction of candidate presentation image OFF to the display data generation unit 28 in step F112, and turns off a selection flag in step F113. The selection flag is an internal flag indicating whether an object is selected (during selection) based on a user operation.

Then, the control unit 30 transmits a frame image display instruction based on a current setting condition to the display data generation unit 28 in step F114. That is, the control unit 30 allows the display data generation unit 28 to generate display data of one frame as a monitoring image based on captured image data of one current frame in response to the current setting, and to output the display data to the display unit 34.

In the period in which the emphasis display function is turned off, the above processes are repeated at each frame timing, so that the display data generation unit 28 supplies the display unit 34 with display data as a normal monitoring image. Accordingly, the main image 200 as the monitoring image as illustrated in FIG. 4A is displayed on the display unit 34.

When the emphasis display function is turned on, the control unit 30 performs processes of steps F102 to F111.

In step F102, the control unit 30 transmits an instruction of candidate presentation image ON to the display data generation unit 28. In this way, the display data generation unit 28 enters a setting state of performing a combining process for superimposing the facial list 201 on the main image 200 (frame image data as the monitoring image).

In step F103, the control unit 30 checks whether there are selection candidate images (facial images) in a current target frame of the captured image data. That is, the control unit 30 checks the detection result of the selection candidate images in the selection candidate detection unit 26. If there are no selection candidate images in the current frame to be processed, the control unit 30 turns off the selection flag in step F113, and transmits a frame image display instruction based on the current setting to the display data generation unit 28 in step F114. In this case, since setting (step F107 which will be described later) of superimposition conditions of the facial list 201 is not performed, the display data is output as the normal monitoring image.

When the selection candidate detection unit 26 has detected one or a plurality of facial images, the selection candidate images are regarded as being present, and the process of the control unit 30 proceeds from step F103 to step F104. In step F104, the control unit 30 acquires and manages information on each detected selection candidate image. That is, the control unit 30 acquires information on the position, the size, the attribute and the like in a frame of each facial image. Furthermore, the control unit 30 checks the identity of an object relative to a previous frame through the function of the tracking processing unit 30*a* and assigns an ID to each facial image.

One ID is assigned to a facial image that is determined as the same object among a plurality of frames. For this reason, in chronological frames, the control unit 30 (the tracking processing unit 30a) performs a tracking process of each facial image. Also, if a facial image detected in a current frame to be processed is a facial image that is continuously tracked from a facial image appearing before a previous frame, the control unit 30 assigns an ID equal to that of the previous frame. The control unit 30 assigns a new ID to a facial image that has newly appeared, or a facial image of a person in a previous frame but that was not continuously tracked. In addition, it is sufficient if the well-known technology disclosed in JP 2004-283959A and the like is used for the tracking process, for example.

In step F105, the control unit 30 allows the candidate information storage unit 27 to store the facial image data itself employed as each selection candidate image. At this time, association information on IDs, positions, sizes, attributes and the like are also stored through association with each facial image.

Then, in step F106, the control unit 30 checks the selection flag and branches a process. When the selection flag is turned off, that is, when a selection operation is not performed by a user, the control unit 30 transmits an image superimposition condition instruction to the display data generation unit 28 in step F107. That is, the control unit 30 performs an instruction for performing a process of combining the candidate presentation image (the facial list) 201, which is obtained by listing facial images as the selection candidate images stored in the candidate information storage unit 27, with the main image 201, and an instruction of processing conditions at that time.

For example, as the processing conditions, a display order of each facial image in the facial list 201 is designated. For example, an arrangement order of the facial images is designated, such as an ascending order of IDs, a descending order of sizes, a position order (an order from the upper left to the lower right, an order from the center of a screen, and the like) in a frame, or an attribute order (a child priority, a female priority and the like).

Furthermore, when the number of facial images displayable on one screen as the facial list 201 is N, the control unit 30 instructs the combining of the first to $N^{th}$ facial images in the above order.

Furthermore, when the frame display 204 is performed for the facial images employed as the selection candidate images on the main image 200, the control unit 30 also instructs the execution of the frame display 204.

Furthermore, the control unit 30 instructs the combining position of the facial list 201, and the size and the like of each facial image on the facial list 201 as the superimposition conditions.

By the instruction (the superimposition condition setting) of step F107, the display data generation unit 28 reads the facial images, which have been stored in the candidate information storage unit 27, in each following frame in response to conditions of the designated order and the like, performs necessary resizing, and enters a setting state of performing a process of combining the resized facial image with the main image 200 (the frame image data as the monitoring image).

Actually, after the superimposition condition setting of step F107, the process of the control unit 30 proceeds to step F108, step F109, and step F114, in this order, and the control unit 30 instructs the display data generation unit to generate display data of one frame based on the current setting conditions in step F114. As described above, the order conditions of the facial list 201 are set, so that the display data generation unit 28 combines each facial image with the main image 200 under the designated order conditions and generates display data including the facial list 201. Then, the display data is supplied to the display unit 34 and for example, display as illustrated in FIG. 4B is performed.

In addition, as described in FIG. 4B and FIG. 4C, a page turning operation, an order turning operation, and a scroll operation and the like of a user are performed for the facial list 201. In this case, the control unit 30 instructs conditions again in step F107 in response to a shunt instruction of the selection candidate image in step F108. For example, in response to a user operation, the control unit 30 sets the facial image displayed on the facial list 201 and an order again.

Figure 7:
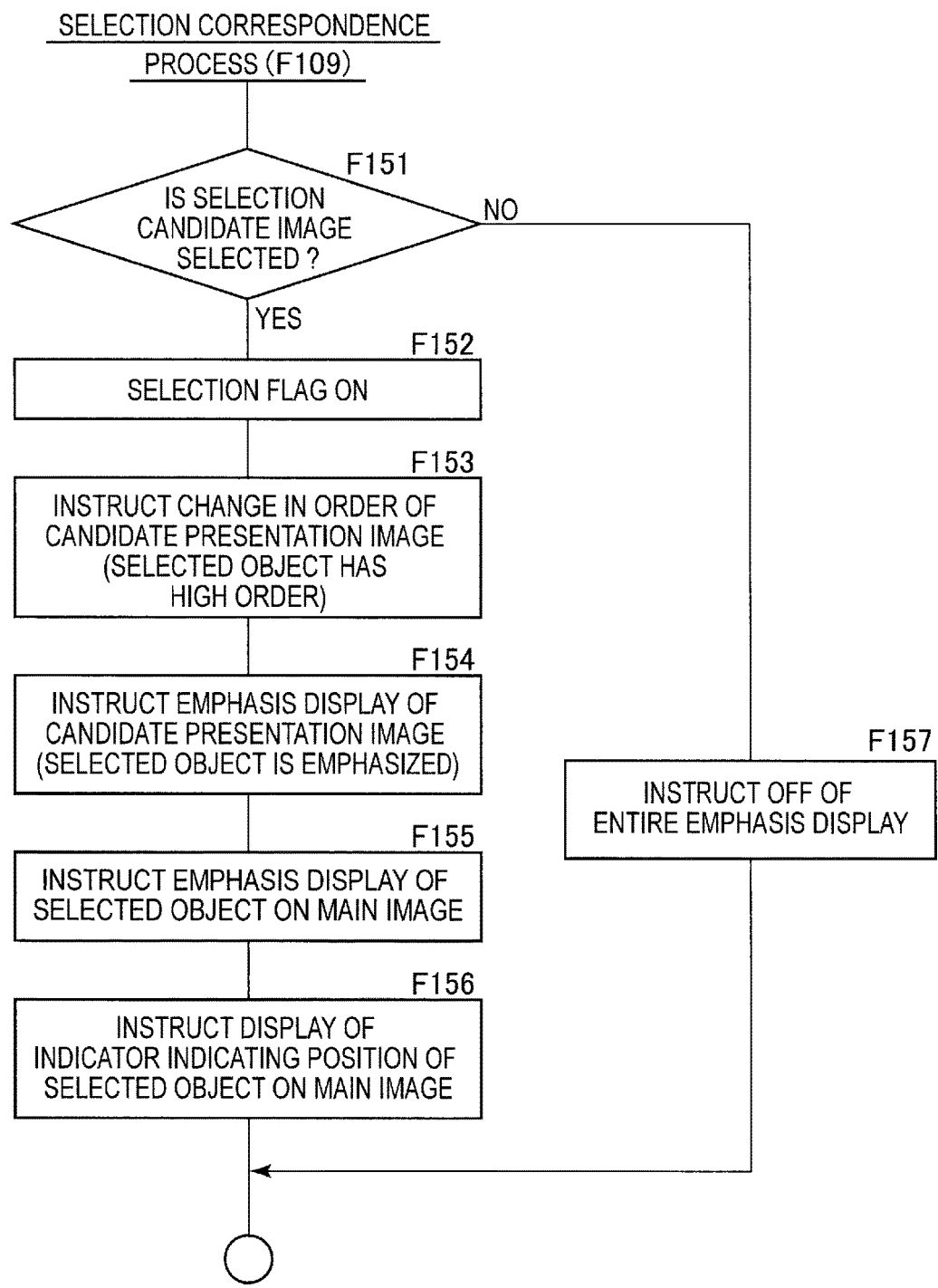
FIG. 7 is flowchart of a selection correspondence process according to a first embodiment.

Furthermore, a selection correspondence process of step F109 is illustrated in detail in FIG. 7. However, when the selection of the selection candidate image by a user, that is, when the selection of the facial image on the facial list 201 is not performed, the process proceeds from steps F151 to F157, so that all emphasis display is instructed to be turned off and the selection correspondence process of step F109 is ended (the process of step F157 will be described later).

Accordingly, in a period until a selection operation is performed, in response to superimposition conditions set or changed in step F107, display data, in which the facial list 201 has been combined with the main image 200, is generated in step F114, and display as illustrated in FIG. 4B and FIG. 4C is performed.

The processes of the digital signal processing unit 20 for the display of the facial list 201, which is performed under the control of the control unit 30 up to now, will be schematically described with reference to FIG. 8.

Figure 8:
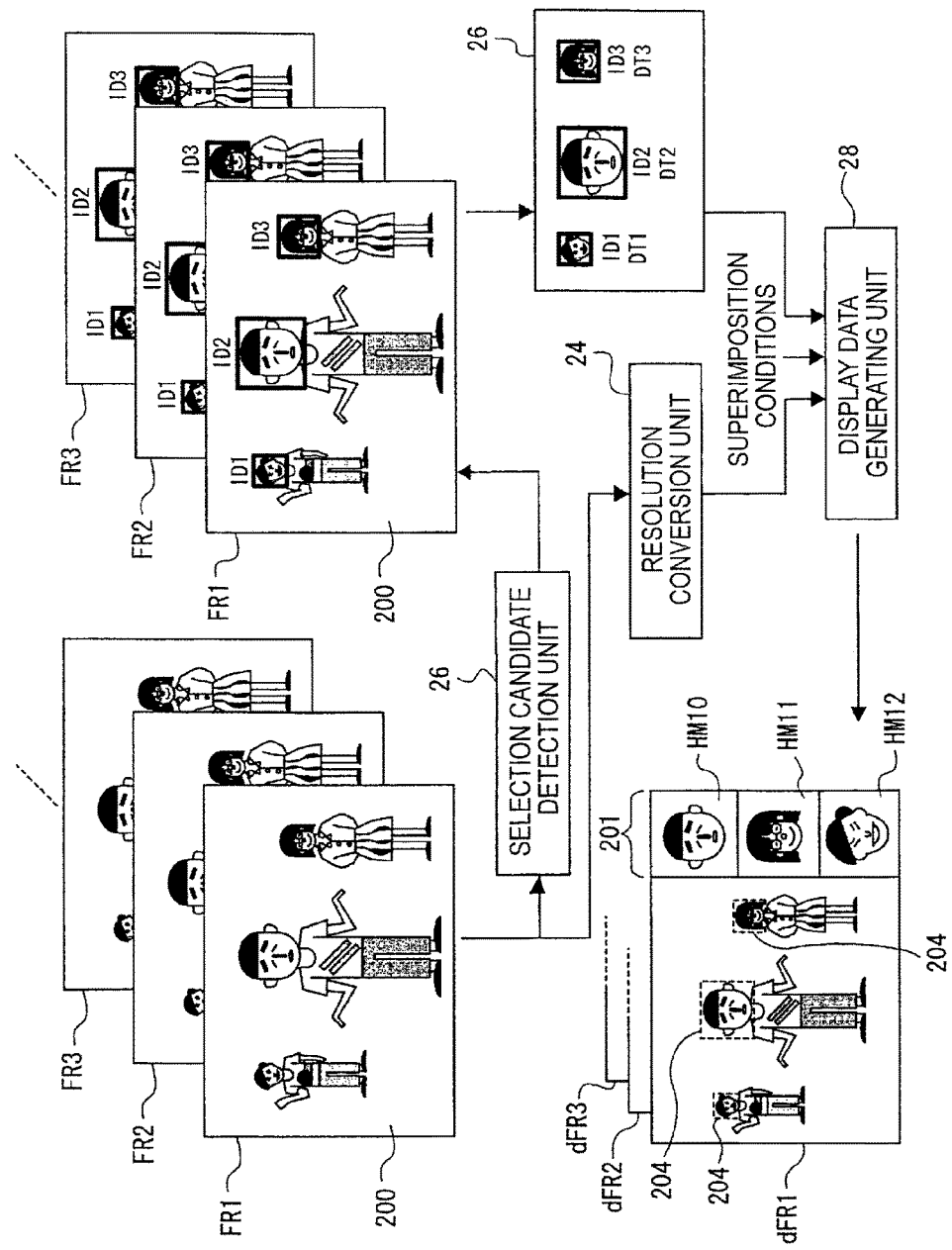
FIG. 8 is an explanatory diagram up to candidate presentation image generation according to an embodiment.

The upper left of FIG. 8 illustrates frames FR1, FR2, FR3 . . . as captured image data. For example, these frames are assumed to include images of three persons.

The selection candidate detection unit 26 performs facial image detection for each frame in the case of the present example, and performs extraction as selection candidate images.

The upper right illustrates the facial images, which have been detected by the selection candidate detection unit 26 and surrounded by frames, in the frames FR1, FR2, FR3 . . . .

In the aforementioned step F104 of FIG. 6, the control unit 30 assigns IDs to the facial images. However, as illustrated by ID1, ID2, and ID3 of FIG. 8, in each frame, the same ID is assigned to facial images (tracked facial images) determined to be the same persons.

Then, in step F105 of FIG. 6, information on the facial image is stored in the candidate information storage unit 27. As illustrated in the lower right of FIG. 8, actual image data of an area extracted as the facial images is stored in the candidate information storage unit 27 as is without expansion, reduction and the like. Furthermore, IDs (the ID1, the ID2, and the ID3) are associated with each facial image data and are stored, and related data DT (DT1, DT2, and DT3) including sizes, positions, attributes and the like is associated in the same manner and is stored. Furthermore, facial images are extracted for each frame and are stored in the candidate information storage unit 27 in step F105. However, the same person is managed using an ID, and in the candidate information storage unit 27, it is proper to update faces of the same person.

The frames FR1, FR2, FR3 . . . of the captured image data are subjected to resolution conversion for a monitoring image in the resolution conversion unit 24 and are supplied to the display data generation unit 28.

The display data generation unit 28 performs a process of superimposing the facial images stored in the candidate information storage unit 27 on the captured image data (the main image 200) subject to the resolution conversion. In this case, the superimposition conditions instructed from the control unit 30 are employed. Furthermore, the facial images stored in the candidate information storage unit 27 have the sizes included in the original frame image data. Thus, the display data generation unit 28 performs a process of resizing each facial image to an appropriate size corresponding to the setting for the facial list 201. Even though the sizes of the facial images stored in the candidate information storage unit 27 are various, it is preferable that the facial images be resized to be almost the same and to be arranged with appropriate sizes easy to be determined, in terms of the external appearance of the facial list 201 itself and the recognition improvement of a user.

Furthermore, when superimposition conditions have been set in the facial list 201 by the control unit 30 such that the facial images are arranged in a descending order of sizes on the main image 200, the display data generation unit 28 performs a combining process of sequentially displaying facial images with a large size from the top of the facial list 201 with reference to the size information stored in the candidate information storage unit 27.

Furthermore, in the case of setting to perform the frame display 204 on the main image 200, a frame image is also combined with each selection candidate image.

In this way, as illustrated in the lower left of FIG. 8, frames dFR1, dFR2, dFR3 . . . are generated as display data. In this case, the facial list 201, in which a facial image of a person HM10 captured large on the captured image data is arranged at the top and other facial images are arranged in sequence of persons HM11 and HM12, is combined with the main image 200 and is displayed. Furthermore, the frame display 204 is also performed for each selection candidate image.

In the display of the facial list 201 as described above, the following appropriate display operation is performed in the processing of the present example.

First, in response to frame progression, facial image tracking is performed and the same ID is assigned to facial images determined to be the same person.

In this way, it is possible to prevent an order of each person from being frequently changed on the facial list 201. For example, basically, facial images are assumed to be arranged in sequence of IDs on the facial list 201. Thus, even though processing is continuous over each frame, since a display order of an ID order is maintained, an order on the facial list 201 is fixed to a certain degree. When the order of the facial images is frequently changed on the facial list 201, since it is difficult for a user to recognize each facial image or to perform a selection operation, it is preferable that the display order be basically managed based on IDs and the display position of the same person not be changed if possible.

Then, by a capturing direction of a user, an operation such as zoom, movement of an object person, and the like, and the position and size of each facial image in a captured image are changed.

For example, it is highly probable for a person having a face captured large or a person captured at the center of a screen to be a person to be focused by a user. Therefore, it is also preferable to allow the facial image of such a person to be easily selected. Therefore, for example, at a certain time point, as illustrated in the example of FIG. 8, when the face of the person HM10 tracked with an ID2 is captured large, this face is displayed on the facial list 201 at a high position. Such a process is performed so that the facial image position is not prevented from being frequently changed on the facial list 201 and a facial image highly probable to be selected by a user can be arranged at a high position of the list.

In addition, for this reason, for order setting (a change in an order) on the facial list 201 based on a size order or a position in an image, it is appropriate to consider a temporal condition that a facial image has a large size continuously in a long frame period to a certain degree or is continuously positioned at the center of a screen.

Furthermore, the facial image detection and the update of the facial list image may not be performed at each frame timing, and may be actually performed at an intermittent frame interval such as once every 30 frames or once every 60 frames.

Returning to FIG. 6, processing after the display of the facial list 201 is started will be described.

A user finds a person on whom to focus on the facial list 201, and then performs a selection operation of the person (refer to FIG. 4C). When the selection operation has been performed, a selection correspondence process is performed in step F109 of FIG. 6.

As illustrated in FIG. 7, after the selection operation of the selection candidate images (the facial images) is performed for the facial list 201, since the control unit 30 allows the process to proceed from steps F151 to F152, the selection flag is turned on. That is, a state indicating "during selection" is reached. Then, the control unit 30 performs a control process for emphasis display in steps F153 and F154.

In step F153, the control unit 30 performs a display order change instruction in the candidate presentation image (the facial list) 201. That is, the control unit 30 allows the facial image of the selected object to be emphasized in the display order. For example, the control unit 30 instructs the display data generation unit 28 to change an order such that the selected facial image is positioned at the top on the facial list 201 as illustrated in FIG. 5A and FIG. 5B.

In step F154, the control unit 30 performs an emphasis display instruction in the candidate presentation image (the facial list) 201. That is, the control unit 30 allows the selected facial image itself to be emphasized on the facial list 201. For example, the control unit 30 instructs the display data generation unit 28 to perform emphasis display for the facial image on the facial list 201 as illustrated in FIG. 5A and FIG. 5B.

In step F155, the control unit 30 instructs the display data generation unit 28 to perform emphasis display for the facial image of the selected object on the main image 200. That is, the control unit 30 allows the selected facial image itself to be emphasized on the main image 200. For example, the control unit 30 allows the selected facial image to be more noticeable than the other facial images, such as instruction of the display of the special frame display 205 as illustrated in FIG. 5B or high luminance display of only the selected object as compared with the other facial images.

In step F156, the control unit 30 instructs the display data generation unit 28 to display the indicator 203 such that the position of the facial image of the selected object is indicated on the main image 200. That is, the control unit 30 allows the position of the selected object image to be emphasized. For example, the control unit 30 instructs the display of the indicator 203 as illustrated in FIG. 5A.

Not all the steps F153 and F154 need be performed. Here, a display instruction for the emphasis on the facial list 201 is performed in steps F153 and F154. However, one of steps F153 and F154 may be performed. Furthermore, an example, in which the emphasis on the facial list 201 is not performed, that is, the processes of steps F153 and F154 are not performed, is also considered.

Furthermore, steps F155 and F156 indicate an emphasizing process of the selected object on the main image 200. However, it is sufficient if one of steps F155 and F156 is performed. Of course, both may be performed.

Image superimposition conditions corresponding to a selection operation by the selection correspondence process are instructed to the display data generation unit 28. Then, in step F114 of FIG. 6, the control unit 30 instructs the display data generation unit 28 to generate display data based on the current setting conditions, so that an image including emphasis display is displayed on the display unit 34 in response to the selection operation. For example, the image as illustrated in FIG. 5A and FIG. 5B is displayed. A user is able to easily find a person on whom to focus in the monitoring image by viewing the image.

After the selection operation, since the selection flag is turned on, the process of the control unit 30 proceeds from steps S106 to F110.

In step F110, the control unit 30 monitors a selection cancellation operation of a user. When the selection cancellation operation is not detected, the process proceeds to step F114. Particularly, a setting change for the display data generation unit 28 is not performed, and thus the display of the facial list 201 and the emphasis display continue.

In addition, the control unit 30 (the tracking processing unit 30a) constantly tracks a facial image, which is detected as a selection candidate image inclusive of the selected facial image, and manages a facial image determined as the same object using the same ID (steps F104 and F105).

Accordingly, while the tracking of the selected facial image is maintained, the indicator 203 or the special frame display 205 is displayed in response to the position of the selection candidate image in the current frame, and the emphasis display is continuously performed.

That is, with the frame progression, the position of the selected object on the main image 200 is changed. However, the facial image is tracked and continuously managed using the same ID, so that the indicator 203 or the special frame display 205 can be displayed at an appropriate position according to the object of the frame.

When the selection cancellation operation has been detected in step F110, the control unit 30 turns off the selection flag in step F111. Then, the process proceeds to step F114.

In this case, when the next frame is processed, the process proceeds to steps F106, F107, F108, and F109, in this order. However, in this case, since the selection flag is turned off and the state indicating "during selection" is not reached, the process proceeds from steps F151 to F157 of FIG. 7. Here, the control unit 30 instructs the display data generation unit 28 to turn off all emphasis display. Then, the process proceeds to step F114. In this way, the display data generation unit 28 ends the emphasis display performed in response to the selection operation (the display corresponding to steps F153 to F156), and for example, generates display data such that the same display as that before the selection as illustrated in FIG. 4C is performed. Accordingly, a user is able to select a desired facial image on the facial list 201 again.

Moreover, when a user performs an operation for turning off the emphasis display function, since the process proceeds from steps F101 to F112 as described above, the display of the facial list 201 is also turned off. In addition, there may actually be cases of performing an operation in which a user turns off the emphasis display function during selection. Accordingly, in step F112, it is desirable to perform an instruction of candidate presentation image OFF and an instruction of emphasis display OFF.

In the imaging apparatus 10 of the present embodiment, which performs the aforementioned processes, a facial image is detected as the selection candidate image in captured image data, the selection candidate image is combined with the main image 200, and display data including the candidate presentation image (the facial list) 201 is generated and displayed on the display unit 34. In this way, a user easily recognizes faces of respective persons captured (frame in). For example, when a plurality of persons are captured with comparatively small facial images, the respective persons are difficult to discriminate in a main image (a monitoring image). However, by the facial list 201, the respective persons are largely and sequentially arranged, so that the respective persons are clearly recognizable.

Then, in response to the selection operation of a user, the image or position of the selection object is emphasized on the main image 200. In this way, the user is able to immediately recognize the position of a person on whom to focus in the captured image. Accordingly, it is possible to easily perform capturing (still image capturing or moving image capturing) with the emphasized person as a main target. In this way, a scene to be captured is prevented from being missed and satisfactory image content is easily obtained.

Furthermore, in the processing example, the display data generation unit 28 generates display data including the candidate presentation image (the facial list) 201 in which the selection candidate images (the facial images) are arranged. Then, the control unit 30 assigns the same ID (identifier) to a facial image, which is determined as the same object, in a plurality of frames included in a moving image as a main image, and controls a display order of facial images in the facial list 201 based on the ID. In this way, it is possible to prevent an arrangement order of the facial images from being frequently changed in the facial list 201 in each frame and the like, and for example, improve the ease of view of respective facial images on the facial list 201 of a user and easily perform a selection operation.

Furthermore, after the selection operation, the control unit 30 allows the display data generation unit 28 to continue the generation of display data including the facial list 201. In this way, it is possible to improve operability when a user desires additional selection (a change in a selected facial image), or to exhibit the recognizability of respective faces by the facial list 201 after the selection operation.

Furthermore, in response to the selection operation for the facial list 201, the control unit 30 allows the display data generation unit 28 to perform display in which a selected facial image is emphasized on the facial list 201. In this way, a user is able to easily recognize a selected object on the facial list 201. A user easily finds a selection error, so that convenience is achieved in actual use.

Furthermore, in the course of frame progression of the main image 200 as a moving image, based on a tracking result in each frame for a facial image of an object corresponding to the facial image selected in the selection operation, the control unit 30 instructs the display data generation unit such that the position of display in which the facial image of the selected object is emphasized is set.

The position of an object in the main image 200 is changed in each frame. Therefore, in each frame as continuous frames of intermittent frames, the control unit 30 performs the indicator 203, the special frame display 205 and the like in response to the position in an image as a tracking result of the selected object image. In this way, it is possible to clearly emphasize and present the selected object on the main image 200 as a moving image all the time.

Meanwhile, in the example, the facial list, in which facial images are vertically arranged as the candidate presentation images 201, is employed as an example. However, as the candidate presentation images 201, various display modes are considered. FIG. 9 illustrates examples thereof.

Figure 9B:
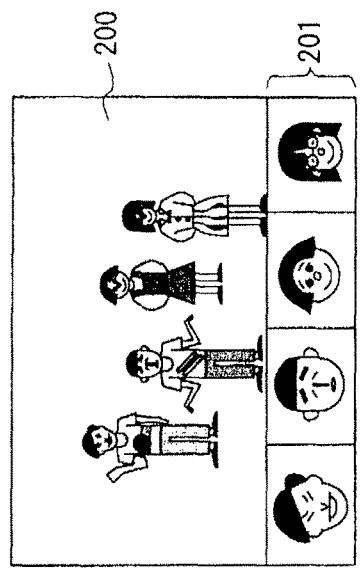
FIGS. 9A to 9D are explanatory diagrams of a candidate presentation image example according to an embodiment.
Figure 9A:
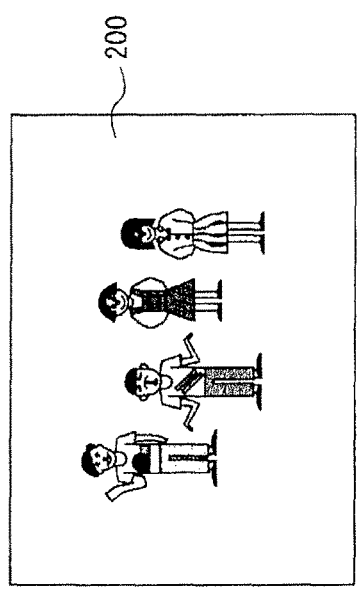

FIG. 9A illustrates the main image 200. Here, when four facial images have been extracted, for example, as the candidate presentation images 201, a facial list in which facial images are horizontally arranged as illustrated in FIG. 9B may be employed.

Figure 9D:
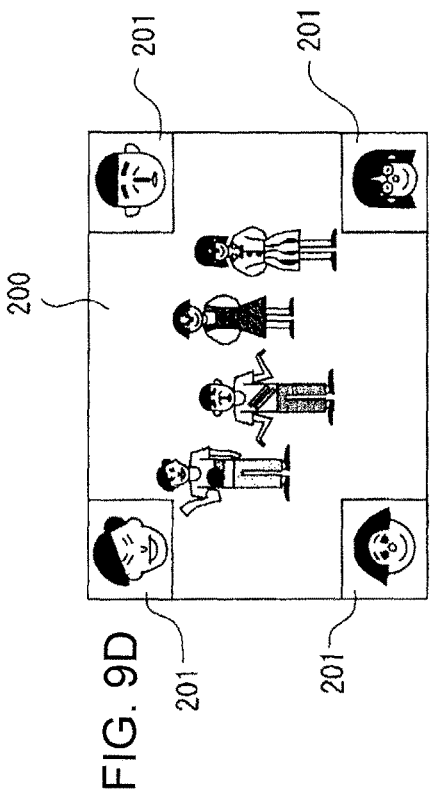
Figure 9C:
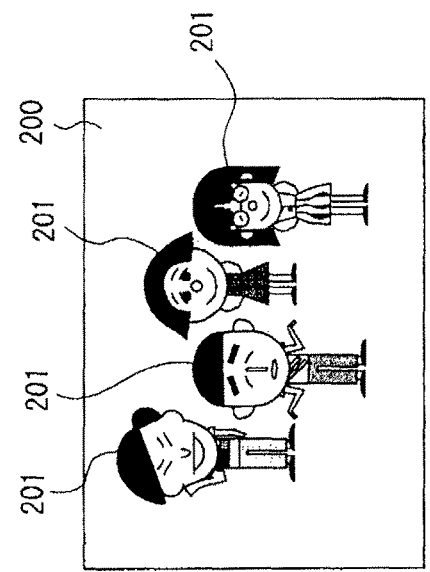

Furthermore, FIG. 9C illustrates the candidate presentation images 201 not displayed in the form of a list. This is an example in which a facial image is expanded and is combined with a facial part of each object on the main image 200. Each expanded facial image is the candidate presentation image 201.

Furthermore, FIG. 9D is an example in which facial images are scattered as the candidate presentation images 201 on different parts of a screen.

As described above, the candidate presentation images 201 is not limited to a list form in which facial images are sequentially arranged. It is sufficient to employ a technique in which each facial image is clearly recognizable on a screen.

5. Processing Example of Second Embodiment as Imaging Apparatus

A processing example for emphasis display will be described as a second embodiment with reference to FIG. 10 and FIG. 11.

In the first embodiment, the display of the candidate presentation image (the facial list) 201 continues after a selection operation. However, the second embodiment is an example in which for example, the display of the facial list 201 ends when there is a selection operation as illustrated in FIG. 5C.

Figure 10:
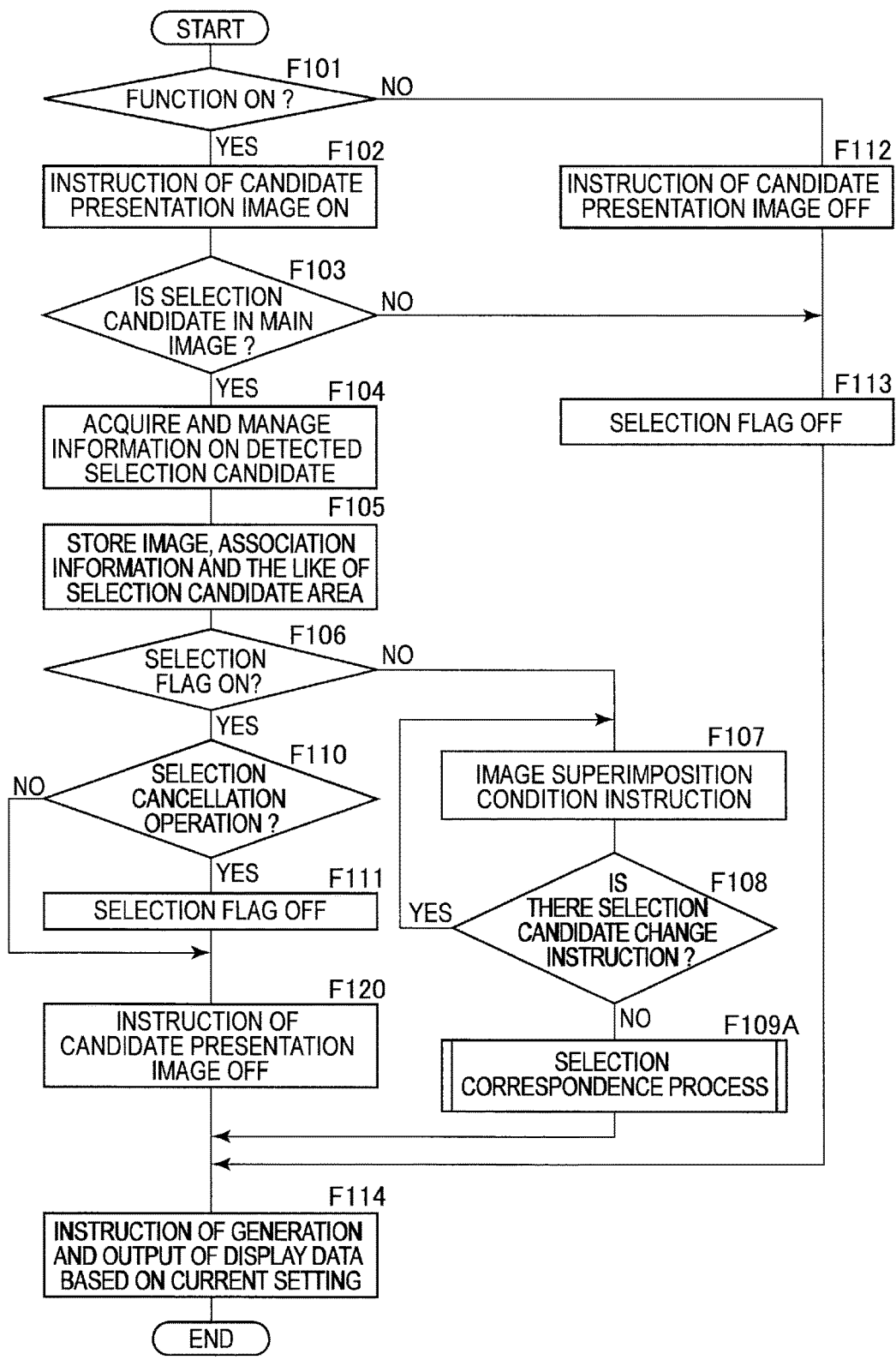
FIG. 10 is flowchart of a display control process according to a second embodiment.

FIG. 10 is a flowchart of processing of the control unit 30 for emphasis display in a period in which monitoring image display is performed in the imaging apparatus 10. The control unit 30, for example, performs the processes of FIG. 10 corresponding to each frame as captured image data.

In FIG. 10, the same step numbers are used to designate the same processes as those of FIG. 6, and a description thereof will be omitted. Differences from FIG. 6 are the addition of step F120 and the content of step F109A as a selection correspondence process.

Figure 11:
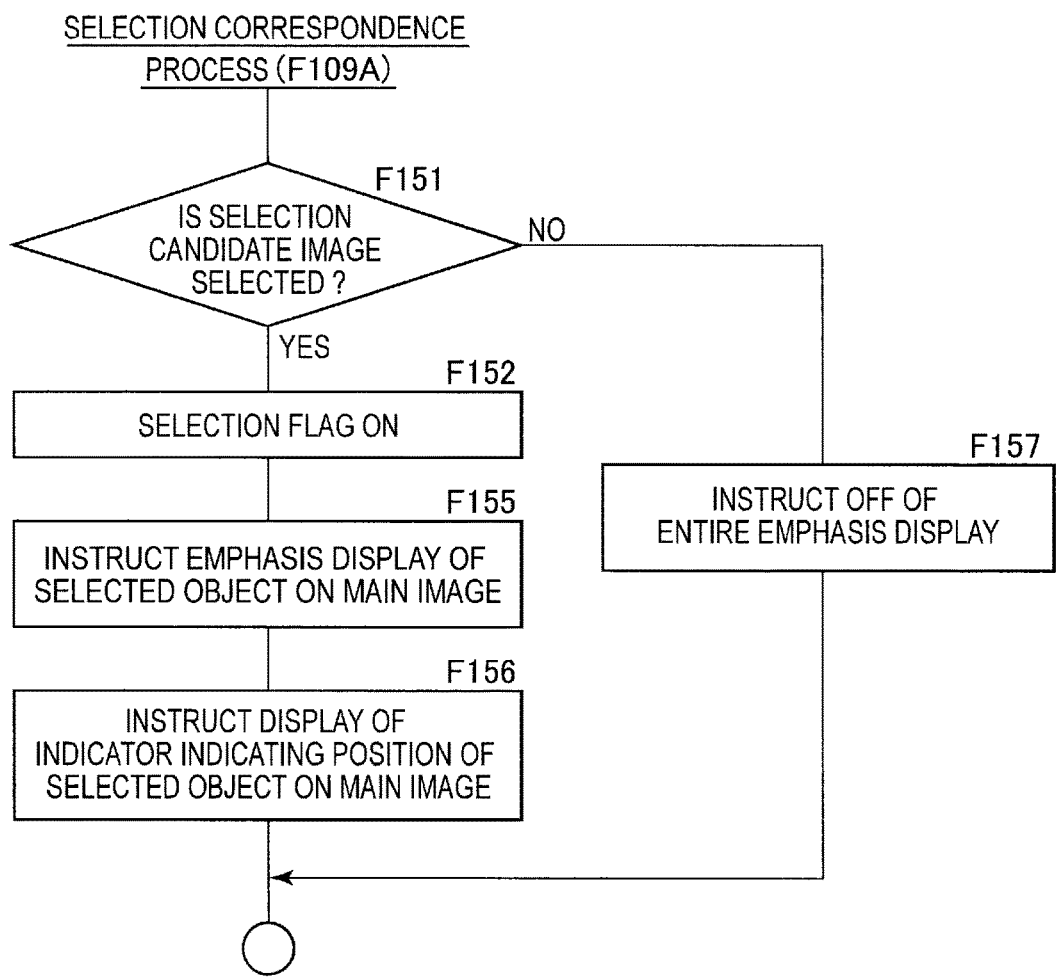
FIG. 11 is flowchart of a selection correspondence process according to a second embodiment.

First, the display of the facial list 201 is performed similarly to the first embodiment, and when a user has performed a selection operation, the processes of FIG. 11 are performed as step F109A.

FIG. 11 is an example in which steps F153 and F154 in the processes of FIG. 7 are not performed, and other details are the same as those of FIG. 7. That is, after the selection operation, since the display of the facial list 201 ends and emphasis display on the facial list 201 is not performed, steps F153 and F154 described in FIG. 7 are not performed.

In response to the selection operation, step F109A of FIG. 10, the selection flag is turned on in step F152 of FIG. 11, and emphasis display on the main image 200 is instructed in steps F155 and F156. Then, in response to a setting state thereof, display data in which the indicator 203, the special frame display 205 and the like have been combined is generated by the display data generation unit 28 in response to the instruction of step F114 of FIG. 10.

Then, after a subsequent frame, the process proceeds to steps F106, F110, and F120, in this order, due to "during selection," and the control unit 30 instructs the display data generation unit 28 to turn off the display of the candidate presentation image (the facial list) 201.

Accordingly, the display data generated in the display data generation unit 28 in step F114 is data not including the facial list 201.

As a consequence, after the selection operation, the display of the facial list 201 ends as illustrated in FIG. 5C. However, the main image 200 including the emphasis display of the indicator 203 and the like is displayed on the display unit 34.

In addition, when the selection cancellation operation has been detected in step F110, the control unit 30 turns off the selection flag in step F111. Then, the process proceeds to steps F120 and F114.

In this case, when a subsequent frame is processed, since the control unit 30 assigns an instruction for turning on the display of the candidate presentation image 201 to the display data generation unit 28 in step F102, and step F120 is not performed, the setting of the candidate presentation image ON continues after reaching step F114. Accordingly, the display of the facial list 201 is performed similarly to before the selection operation. Furthermore, in this case, since the selection flag is turned off and the state indicating "during selection" is not reached, the process proceeds from steps F151 to F157 of FIG. 11, and the control unit 30 instructs the display data generation unit 28 to turn off all emphasis display.

As a consequence, when there is the selection cancellation operation, a display state before the selection is returned to, so that a user is able to select a desired facial image again on the facial list 201.

In the aforementioned second embodiment, in response to the selection operation for the candidate presentation image (the facial list) 201, the control unit 30 instructs the display data generation unit 28 to end the display of the facial list 201. In this way, during the selection, it is possible to clearly present a selected object through only emphasis in the main image 200 (the monitoring image), and a user is able to easily recognize an object to be focused and to recognize an entire captured object by widely using a screen. Particularly, in a use case in which reselection is not performed, the display of the facial list 201 is not performed during the selection, so that it is possible to easily see a captured target on a display screen, which is preferable to a user.

In addition, it is difficult to generalize which of the first embodiment in which the display of the facial list 201 is performed during the selection and the second embodiment in which the display of the facial list 201 is not performed during the selection is preferable to a user. It depends on a use case, a user's preference, a situation of object selection and the like. Therefore, it is sufficient if a user is able to switch the application of the first embodiment and the application of the second embodiment according to a setting operation of the user.

6. Processing Example of Third Embodiment as Imaging Apparatus

A processing example for emphasis display will be described as a third embodiment with reference to FIG. 12 and FIG. 13. In addition, a description of the third embodiment relates to an example in which the display of the facial list 201 continues after the selection similarly to the first embodiment.

The third embodiment is a processing example of considering the display of a candidate presentation image after tracking is not possible in a tracking process after selection and emphasis display are performed.

Figure 12:
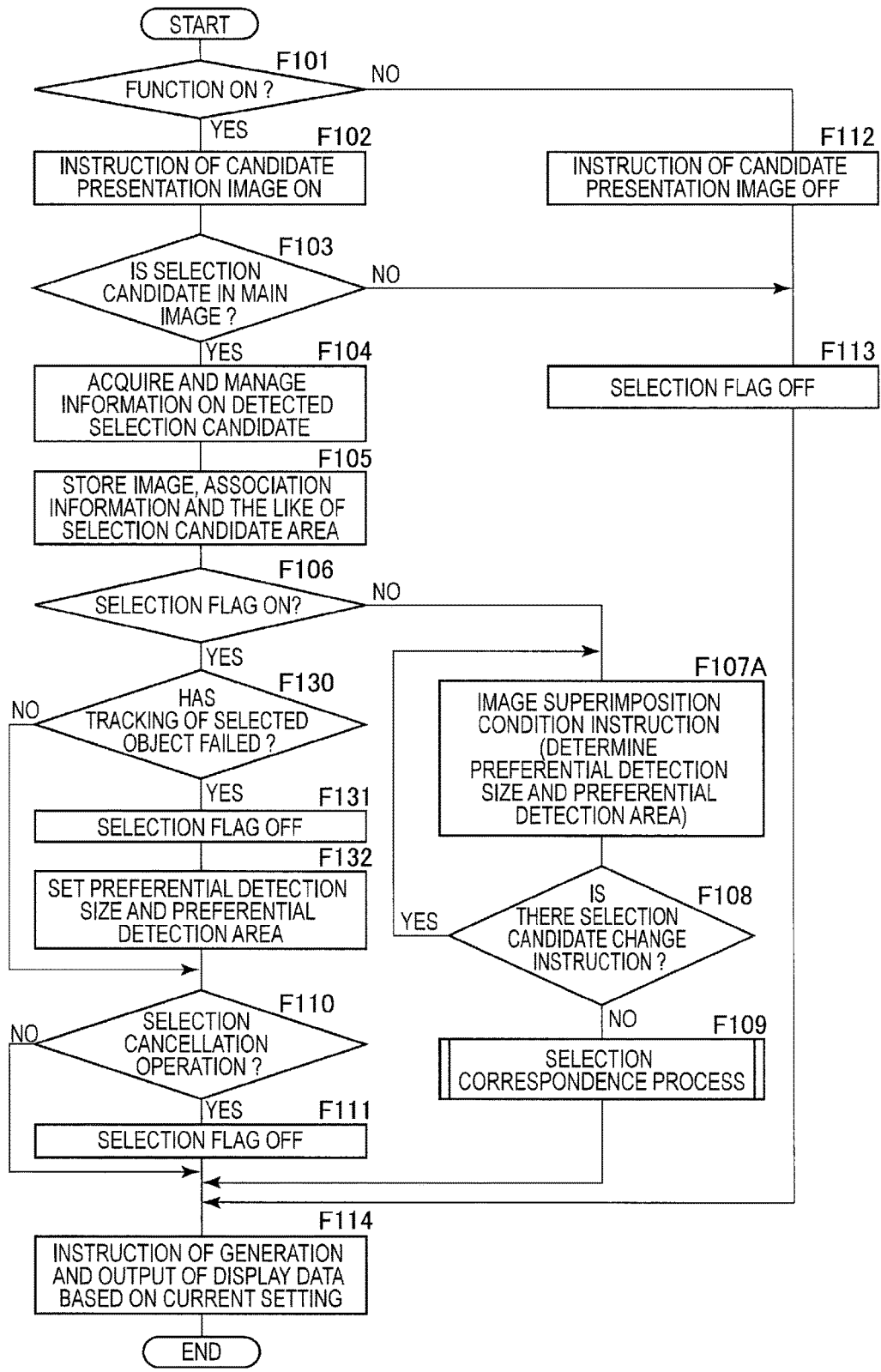
FIG. 12 is flowchart of a display control process according to a third embodiment.

FIG. 12 is a flowchart of processing of the control unit 30 for emphasis display in a period in which monitoring image display is performed in the imaging apparatus 10. The control unit 30, for example, performs the processes of FIG. 12 in correspondence to each frame as captured image data.

In FIG. 12, the same step numbers are used to designate the same processes as those of FIG. 6, and a description thereof will be omitted. Differences from FIG. 6 are the addition of steps F130 to F132 and the content of step F107A.

Also in the processing example of FIG. 12, basically, the selection candidate detection unit 26, for example, detects facial images as selection candidate images, and in response to this, the control unit 30 performs the display of the candidate presentation image 201 (steps F103, F104, F105, F107A, and F114).

For an instruction of image superimposition conditions in step F107A, condition setting corresponding to determination of a preferential detection size and a preferential detection area, which will be described later, is performed. However, this is a process after tracking of an object selected once is interrupted, and is the same as step F107 of FIG. 6 until a selection operation is initially performed.

In addition, tracking for ID assignment described in the processing example of FIG. 6 is performed for a detected facial image all the time. Furthermore, after a certain facial image is selected on the facial list 201, tracking in a subsequent frame is performed for the facial image in the same manner.

For the processing example of FIG. 12, processes after a selection operation is performed for the display of the facial list 201 will be described with reference to FIG. 13.

When a selection operation is performed for the display of the facial list 201 by a user at a certain time point, the selection flag is turned on in a selection correspondence process (the aforementioned process of FIG. 7) of step F109 of FIG. 12, and emphasis display setting is performed. Then, display data is generated in response to a display data generation instruction in final setting of step F114. In this way, for example, as illustrated in FIG. 13A, emphasis display is performed on the main image 200 by the indicator 203, the special frame display 205 and the like, and emphasis display is further performed on the facial list 201 by high ordered classification, thick line list frame 202 and the like. In addition, in FIG. 13A, the facial image of a person HM10 is assumed to be selected.

At the time point at which a subsequent frame is processed, since the selection flag is turned on, the control unit 30 proceeds from step F106 to step F130.

The control unit 30 tracks facial images which are constantly detected as selection candidate images inclusive of the selected facial image. However, in step F130, the control unit 30 determines whether tracking of the facial image of the selected object is continuable.

When the tracking is continued in the current frame, the process proceeds from step F130 to step F110, a selection cancellation operation is checked, and when there is the selection cancellation operation, the process proceeds to step F114.

Accordingly, while the tracking for the selected facial image is maintained, the indicator 203 or the special frame display 205 is displayed in response to the position of the selected facial image in the current frame, and the emphasis display is continuously displayed. Up to now, this is the same as the first embodiment.

However, since the tracking of the facial image of the selected object is based on the assumption that there is a facial image to be recognized as a facial image in a frame image, the tracking may be interrupted due to the situation such as movement of the object, a change in the capturing direction, or someone passing in front of the object. For example, as the situation illustrated in FIG. 13B, when the face of the selected person HM10 is out of a frame, the tracking is interrupted.

As described above, when the tracking of the facial image of the selected object is interrupted, the control unit 30 determines tracking failure in step F130, and proceeds to step F131. In this case, since it is not possible to perform the emphasis display on the main image 200, the control unit 30 releases the selection state and turns off the selection flag in step F131.

Then, in step F132, the control unit 30 sets the preferential detection conditions. For example, the control unit 30 sets a preferential detection size and a preferential detection area. The preferential detection size and the preferential detection area are conditions for estimating that a facial image entering a frame thereafter is the same person as the person that has been selected (for which the tracking has been interrupted).

In detail, the preferential detection size indicates size information of a selected facial image that was being tracked immediately before. The preferential detection area indicates an area in a frame image including the selected facial image that was being tracked immediately before. For example, immediately before the tracking is interrupted, an area in which a selected facial image is located is set as indicated by a preferential selection area PA of FIG. 13B.

After the above processes are performed, since the selection flag is turned off in processing from a subsequent frame, steps F107A, F108, and F109 are performed. First, in step F109 (step F157 of FIG. 7), the control unit 30 instructs the display data generation unit 28 to turn off all emphasis display. In this way, the display is not selected, and the emphasis display on the main image 200 and the emphasis display on the facial list 201 are turned off.

Furthermore, in a frame immediately after the tracking failure, the facial image of the person HM10 selected up to now is not detected (F104 and F105). Thus, for example, as illustrated in FIG. 13B, facial images of persons HM11 and HM12 detected at that time point are arranged on the facial list 201, and the facial image of the person HM10 does not remain on the facial list 201.

In this way, the same state as that before the selection is obtained. However, in this case, the control unit 30 performs an image superimposition condition instruction, which corresponds to the determination of the preferential detection conditions in step F107A for selection candidate images (facial images) detected in each frame. That is, the control unit 30 determines whether the facial images managed in steps F104 and F105 satisfy the preferential detection conditions set in step F132, and performs an image superimposition condition instruction corresponding to the determination.

In detail, the control unit 30 determines whether the positions in a frame of newly appearing facial images (for example, facial images to which IDs have been newly assigned) after the tracking failure are in the preferential detection area PA (whether some of the facial images are in the preferential detection area PA or the facial images are positioned near the preferential detection area PA). Moreover, the control unit 30 determines whether the sizes of the newly appearing facial images coincide with or approximate the preferential detection size.

Here, when the newly appearing facial images, for example, correspond to both the preferential detection area and the preferential detection size, the control unit 30 estimates that the facial image has previously entered a selection state but is a facial image of an object for which tracking has failed. Then, as an image superimposition condition instruction of step F107A, the control unit 30 instructs the display data generation unit 28 to preferentially display the facial image on the facial list 201. The preferential display, for example, indicates that the facial image is displayed first on the list.

Then, in step F114, the control unit 30 instructs the generation of display data in the current setting.

Under the control of the control unit 30, the display data generation unit 28 generates the display data, so that the facial image, the tracking of which has been estimated to have failed, is displayed first on the facial list 201. For example, as illustrated in FIG. 13C, the facial image of the person HM10 is displayed first.

Then, when a user performs a selection operation for selecting the person HM10 again on the facial list 201 at a certain time point, emphasis display is performed by the selection correspondence process of step F109 as illustrated in FIG. 13D.

In the third embodiment as described above, in the course of frame progression of the main image 200 as a moving image, when tracking of an object image corresponding to a selection candidate image selected in a selection operation is not possible, the control unit 30 sets preferential detection conditions. Then, when the selection candidate image (the facial image) detected by the selection candidate detection unit 26 satisfies the preferential detection conditions, the control unit 30 performs control such that the selection candidate image is preferentially displayed on the candidate presentation image (the facial list) 201.

When a capturer performs capturing as a general user, there are many cases in which a capturing direction is shaken or a moving object is not able to be tracked. Therefore, even after an object is selected once, there are cases in which the object is out of a frame. Moreover, there are cases in which the selected object is not captured due to an obstacle, a person and the like between the imaging apparatus 10 and the object.

In such a case, since emphasis of the object is not possible, the emphasis display ends. However, the object may then return to a frame with the same size or in the same position in many cases. At this time, it is preferable for reselection by a user to be easy. Thus, when returning is estimated, for example, the object is allowed to be displayed first on the facial list 201, resulting in the achievement of the recognizability of a user, as well as ease of a selection operation thereafter.

As preferential display, in addition to employing a high position, it may be possible to perform display for prompting selection (for example, a list frame is highlighted for display or flickered for display).

Furthermore, whether the newly appeared facial image is a facial image of the same person as a person previously selected is estimated according to the preferential detection conditions.

For determination regarding whether the newly appearing facial image is the facial image of the same person as the selected person, use of an individual identification technology can be considered. However, as described above, a processing load of the individual identification process is large, and the individual identification process is difficult to apply to consumer appliances. Furthermore, when capturing conditions are not right, reliability is not obtained. Therefore, in the present embodiment, no individual identification process is performed, and a facial image in a situation similar to the situation of tracking failure is estimated as the selected facial image. In this way, preferential presentation to a user is possible by a simple process, and a process very suitable for the imaging apparatus 10 as a consumer appliance is obtained.

Particularly, since the preferential detection conditions are based on a position or a size in a main image immediately before the tracking of an object image corresponding to the candidate presentation image selected in the selection operation is not possible, it is possible to comparatively and accurately determine whether the newly appearing object image is an object image out of tracking.

In addition, a determination technique can be variously considered. For example, only one of a size condition and a position condition may be determined, or a range "satisfying" a condition may be wide to a certain degree. Of course, a user may be allowed to set the conditions.

Furthermore, it is also appropriate to add attributes to conditions. For example, an attribute of "male and child" is controlled to be included in the preferential detection conditions, so that it is possible to increase the accuracy of determination regarding whether an appearing facial image is a facial image of the same person as that of the selected facial image.

In addition, the preferential detection conditions including the position condition, the size condition and the like may be cleared when a certain time passes. The high probability of the same person entering a frame at almost the same position or with almost the same size is based on an assumption that the current period is a period in which not much time has passed from tracking failure. Therefore, it is sufficient if the preferential detection conditions set in step F132 are cleared when a predetermined time passes, and the display of the facial list 201 is performed under normal conditions.

Furthermore, the processes after the tracking failure in the third embodiment are applicable to a processing example in which the display of the facial list 201 is not performed during selection similarly to the second embodiment. That is, when the emphasis display ends due to the tracking failure and the display of the facial list 201 is performed again, adding determination of the preferential detection conditions can be considered.

7. Processing Example of Fourth Embodiment as Imaging Apparatus

A processing example for emphasis display will be described as a fourth embodiment with reference to FIG. 14. In addition, a description of the fourth embodiment relates to an example in which the display of the facial list 201 continues after selection similarly to the first embodiment. However, the fourth embodiment is also applicable to an example in which the display of the facial list 201 is not displayed during the selection similarly to the second embodiment.

The fourth embodiment is an example of allowing the display data generation unit 28 to generate display data including the candidate presentation image (the facial list) 201 using selection candidate images satisfying predetermined conditions among selection candidate images detected in the selection candidate detection unit 26.

Figure 14:
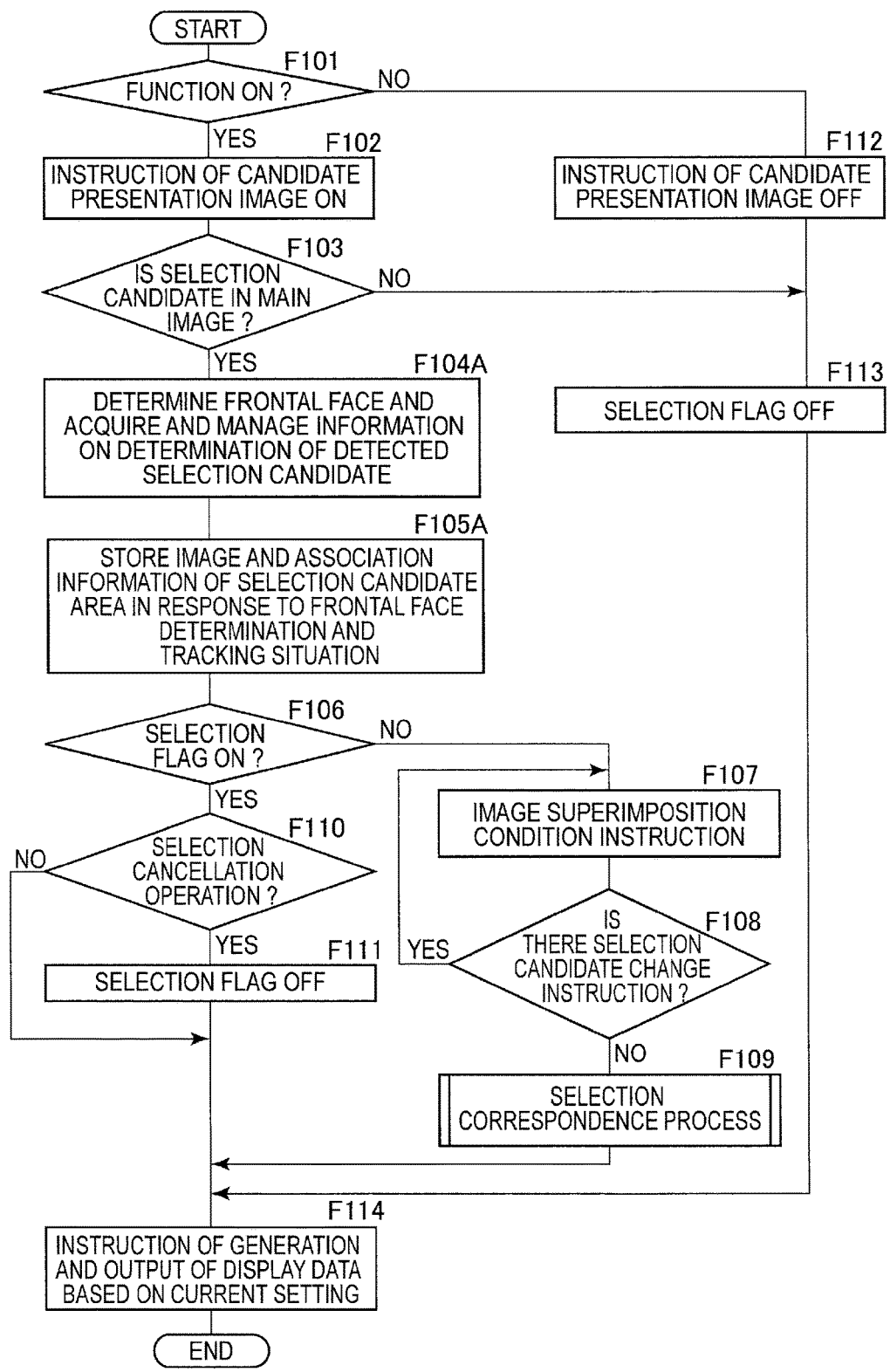
FIG. 14 is flowchart of a display control process according to a fourth embodiment.

FIG. 14 is a flowchart of processing of the control unit 30 for emphasis display in a period in which monitoring image display is performed in the imaging apparatus 10. The control unit 30, for example, performs the processes of FIG. 14 corresponding to each frame as captured image data.

In FIG. 14, the same step numbers are used to designate the same processes as those of FIG. 6, and a description thereof will be omitted. Differences from FIG. 6 are the content of steps F104A and F105A.

In this case, the control unit 30 checks that there are selection candidate images (facial images) in a current target frame of captured image data in step F103, and proceeds to step F104A.

In step F104A, the control unit 30 determines whether each detected facial image is a facial image directed forward (frontal face determination). For example, since whether the facial image is a frontal face can be identified at the time of detection of the selection candidate detection unit 26, it is sufficient if the control unit 30 receives information regarding whether each facial image is a frontal face from the selection candidate detection unit 26.

Then, the control unit 30 acquires and manages information on the position, the size, the attribute and the like in a frame of each facial image. Furthermore, the control unit 30 checks the identity of an object relative to a previous frame through the function of the tracking processing unit 30a and assigns an ID to each facial image. Also in this case, the control unit 30 assigns the same ID as that in a past frame to a facial image that has been effectively tracked.

In step F105A, in response to a result of the frontal face determination and a tracking situation, the control unit 30 performs a process of storing facial image data, IDs, and association information on positions, sizes, attributes and the like of each facial image in the candidate information storage unit 27.

Processes after step F106 are the same as those of FIG. 6.

Hereinafter, the management in step F104A and the storage to the candidate information storage unit 27 in step F105A are performed according to the following rules (a), (b), (c), and (d).

(a) A new ID is assigned to a facial image of a new frontal face not tracked until now, and image data, association information, and an ID are stored.
(b) A facial image of a frontal face, which is a facial image being tracked, is managed with the same ID as that in a previous frame, and image data, association information, and an ID are stored.
(c) A facial image of a non-frontal face, which is a facial image being tracked, is continuously managed with the same ID as that in a previous frame. The candidate information storage unit 27 does not update or remove facial image data and an ID. Association information in which a change has occurred, such as position information or size information, is updated.
(d) A facial image, which is a new facial image and is not a frontal face, is not assigned an ID, and is not treated as a selection candidate image. Image data and association information are not stored in the candidate information storage unit 27.

Based on the management and storage rules, all facial image data that is finally stored in the candidate information storage unit 27 and is used for the display of the facial list 201 is facial data of a frontal face stored according to the rules (a) and (b). In addition, there are cases in which the facial image of (c) is a facial image to which an ID has been already assigned in a past frame and is a facial image for which association information and an ID are stored in the candidate information storage unit 27, but which is not directed to the front in a current frame. That is, the same person as in a past frame is estimated by tracking. However, there are cases in which an object lowers or twists his/her head and a frontal face is not detected in the current frame. However, since the frontal face exists as a face in frame image data, it is included in the facial list 201. However, since the facial image data is not updated as described in (c), facial image data of a past frame is used in the facial list 201.

Through such a process, the facial list 201 of the display data generated in the display data generation unit 28 in response to the processes of steps F107 and F114 is available as a list in which only frontal faces are arranged. In detail, facial images directed to the front at the current time point are used and past facial images directed to the front are used for facial images not directed to the front, so that the facial list 201 is generated.

As described above, in the fourth embodiment, the control unit 30 allows the display data generation unit 28 to generate display data including the facial list 201 using facial images satisfying predetermined conditions (for example, frontal faces) among selection candidate images detected in the selection candidate detection unit 26. In this way, it is possible to present the candidate presentation image (the facial list) 201 in which a user easily recognizes an object. Furthermore, in this way, the selection operation is also easily performed.

In addition, the predetermined conditions are variously considered in addition to the frontal faces.

For example, by using attribute conditions, it is also possible to display only a facial image of a child on the facial list 201 by treating the facial image as a selection candidate image, or to display only a facial image of a female on the facial list 201 by treating the facial image as a selection candidate image.

Figure 15:
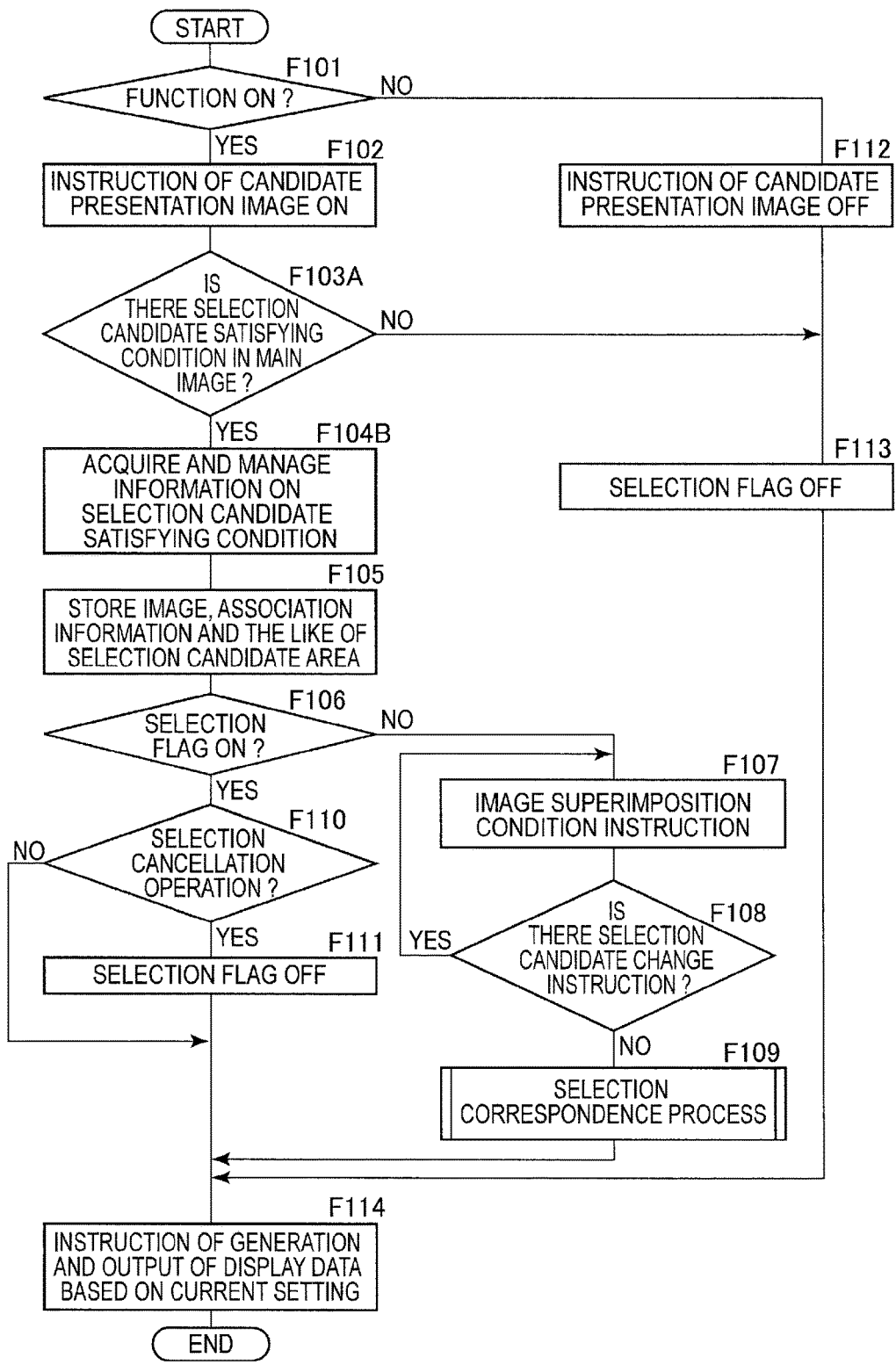
FIG. 15 is flowchart of another display control processing example according to a fourth embodiment.

Particularly, in the case of using the attribute conditions in which there is no change according to frame progression as described above, a processing example as illustrated in FIG. 15 may be performed, for example.

That is, in step F103A, the predetermined conditions are added to determination regarding whether there is a selection candidate image, and for example, determination regarding whether "there is a facial image of a child" is employed. Then, in step F104B, only a facial image satisfying the condition of "a facial image of a child" is treated as the selection candidate image, and is subject to information acquisition, and ID setting/management processes. It is sufficient if the same processes as those of FIG. 6 are performed for others.

As described above, in the step of treating the facial image as the selection candidate image, the predetermined conditions may be determined. In this way, for example, an operation for displaying only the facial image of the child on the facial list 201 is realized. When the capturing purpose of a user relates to a specific attribute of his/her child and the like, only facial images of the attribute are listed as described above, so that it is also possible to increase selectability.

Furthermore, it is also preferable for the attribute conditions employed as the selection candidate image to be set to be selected by a user.

Furthermore, in the processing example of FIG. 15, the fact that the facial image is the aforementioned frontal face image may be employed as a determination condition of step F103A. In this case, a twisted face enters a state not treated as the selection candidate image.

Moreover, in the processing examples of FIG. 14 and FIG. 15, as conditions other than the frontal face or the attribute, an expression determination result of a smiley face and the like may be used, or a facial image size may be used.

8. Application to Reproduction Apparatus

So far, the embodiments of the imaging apparatus 10 have been described. However, the image processing apparatus according to an embodiment of the present technology is also applicable to a reproduction apparatus.

Figure 16:
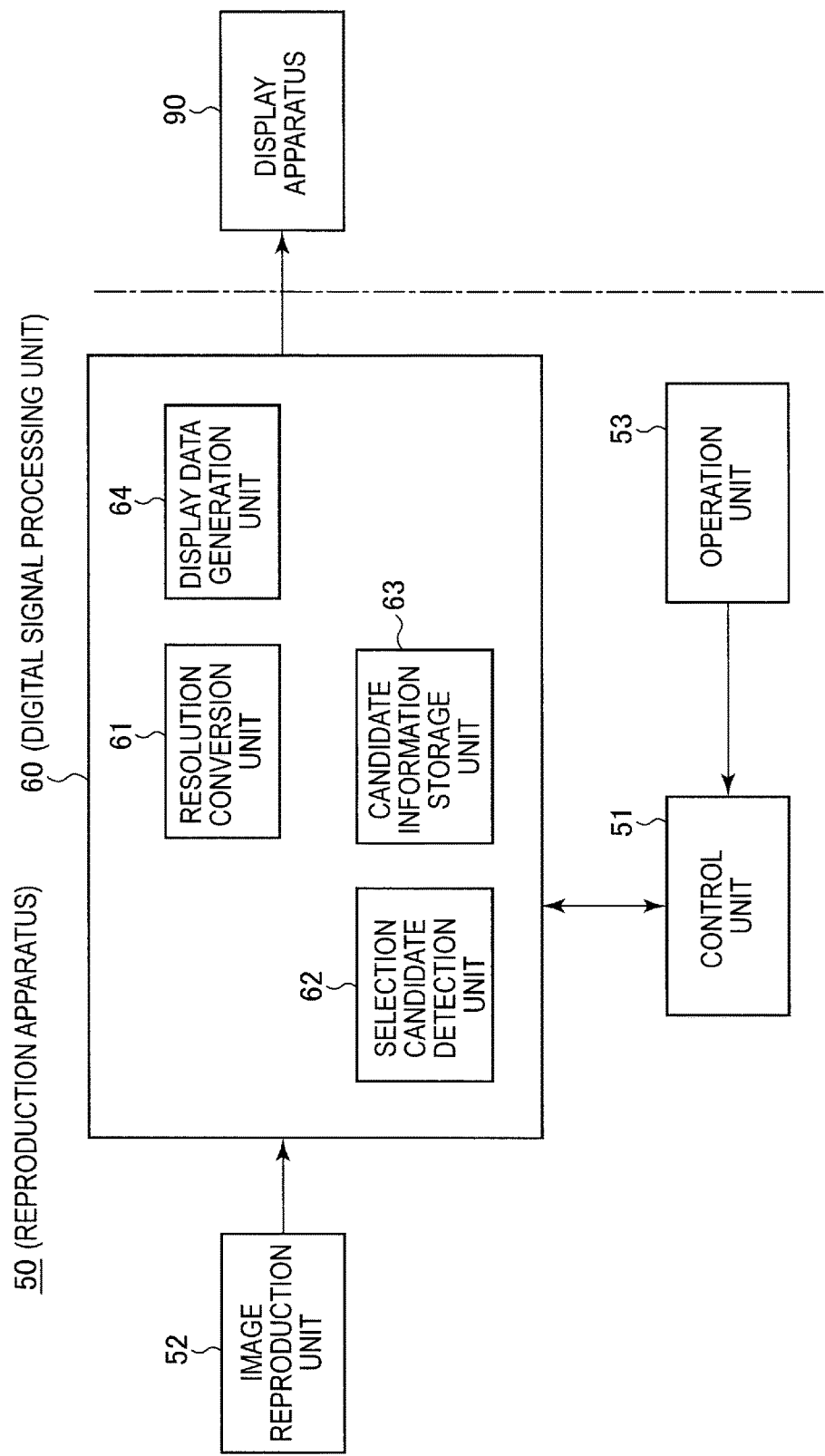
FIG. 16 is a block diagram of a reproduction apparatus according to an embodiment.

FIG. 16 illustrates a configuration example of a reproduction apparatus 50 having the image processing apparatus 1 therein.

The reproduction apparatus 50 includes a control unit 51, an image reproduction unit 52, an operation unit 53, and a digital signal processing unit 60. In addition, a display apparatus 90 is illustrated as a separate configuration. However, the display apparatus 90 may be integrally formed with the reproduction apparatus 50.

The image reproduction unit 52, for example, is illustrated as a part that reproduces image data as a moving image or a still image from a recording medium such as an optical disc, a magneto optical disc, a magnetic disk, a memory card using a nonvolatile memory, an HDD, or an embedded memory chip (a RAM, a ROM, a flash memory and the like). The image reproduction unit 52 transmits the reproduced image data to the digital signal processing unit 60.

The digital signal processing unit 60 includes a resolution conversion unit 61, a selection candidate detection unit 62, a candidate information storage unit 63, and a display data generation unit 64.

The resolution conversion unit 61 performs a resolution conversion process, which is necessary for display output, for the reproduced image data.

The selection candidate detection unit 62 and the candidate information storage unit 63 perform the detection of selection candidate images and the storage of the selection candidate images and associated data for the purpose of emphasis display, similarly to the selection candidate detection unit 26 and the candidate information storage unit 27 in the aforementioned imaging apparatus 10.

The display data generation unit 64 generates display data using image data (a main image) from the resolution conversion unit 61 and supplies the display data to the display apparatus 90 when the emphasis display function is turned off. When the emphasis display function is turned on, the display data generation unit 64 generates display data by performing a superimposition process of superimposing a candidate presentation image on the main image, and when there is a selection operation of a user, the display data generation unit 64 generates display data including an image (or an image effect) for emphasizing a corresponding object, and supplies the display data to the display apparatus 90.

The control unit 51 controls the operations of the image reproduction unit 52 and the digital signal processing unit 60. Furthermore, the control unit 51 detects operation information from the operation unit 53.

The operation unit 53 includes an operator (a key or a dial), a remote controller, a touch panel operation unit of the display apparatus 90, and the like, which are necessary when a user of the reproduction apparatus 50 performs various operations.

In such a configuration, for example, when a moving image from the image reproduction unit 52 is reproduced, the control unit 51 performs the process of FIG. 2A, the processes of FIG. 6 and FIG. 7, FIG. 10 and FIG. 11, FIG. 12, FIG. 14, or FIG. 15, so that a candidate presentation image is superimposed on a reproduced moving image displayed on the display apparatus 90, or it is possible to perform emphasis display on the reproduced moving image (a main image), and further emphasis display on the candidate presentation image in response to the selection of a user. Furthermore, for example, when a still image from the image reproduction unit 52 is reproduced, the control unit 51 performs the process of FIG. 2B, so that a candidate presentation image is superimposed on a reproduced still image displayed on the display apparatus 90, or it is possible to perform emphasis display on the reproduced still image (a main image), and further emphasis display on the candidate presentation image in response to the selection of a user.

As described above, the emphasis display function according to an embodiment of the present technology is also applicable to the reproduction apparatus 50, and a user viewing a still image or a moving image is able to recognize a person (for example, a face) in a screen thereof as a candidate presentation image and select the person. Then, in response to the selection, the user is able to easily recognize the position of the selected face in the main image. For example, when a moving image or a still image captured at a sporting event is reproduced in a house and the like, the user is able to easily find his/her child in the reproduced image, so that a function very useful as the reproduction apparatus 50 is obtained.

In addition, since the imaging apparatus 10 illustrated in FIG. 3 is able to reproduce the captured image data recorded in the recording unit 15 and display the reproduced image data on the display unit 34, it can be said that the imaging apparatus 10 of FIG. 3 has the reproduction apparatus 50 of FIG. 16 therein. That is, the emphasis display function according to an embodiment of the present technology is also available in the case of performing image reproduction of a moving image or a still image captured in the imaging apparatus 10.

Furthermore, FIG. 16 illustrates the reproduction apparatus 50. However, use of the image reproduction unit 52 as a television tuner or a network communication unit may be considered. That is, it is possible to perform the emphasis display function for received image data, downloaded image data and the like.

9. Application to Program and Computer Apparatus

So far, the embodiments of the image processing apparatus 1, the imaging apparatus 10, and the reproduction apparatus 50 have been described. However, the processes for the aforementioned emphasis display function may be performed by hardware or software.

A program of an embodiment is a program that causes, for example, an arithmetic operation processing device, such as a CPU (Central Processing Unit) or a DSP (Digital Signal Processor), to perform the processes described in the aforementioned embodiments.

That is, the program of the embodiment is a program that causes the arithmetic operation processing device to perform a process of detecting a selection candidate image as an object image in a main image as a moving image or a still image, a process of combining the detected selection candidate image with the main image and generating and outputting display data including a candidate presentation image, and a process of generating and outputting display data including a display, in which an object image corresponding to a selected candidate presentation image is emphasized in the main image, in response to a selection operation for the displayed candidate presentation image.

In detail, it is sufficient if the program of the embodiment is a program that causes the arithmetic operation processing device to perform the processes of FIG. 2A, FIG. 2B, FIG. 6 and FIG. 7, FIG. 10 and FIG. 11, FIG. 12, FIG. 14, or FIG. 15.

By such a program, an apparatus for performing the aforementioned emphasis display function can be realized using the arithmetic operation processing device.

Such a program can be recorded in advance on an HDD as a recording medium embedded in an appliance such as a computer apparatus, a ROM in a microcomputer having a CPU, and the like.

Alternatively, the program can be temporarily or permanently stored (recorded) in a removable recording medium such as a flexible disk, a CD-ROM (Compact Disc Read Only Memory), a MO (Magnet Optical) disc, a DVD (a Digital Versatile Disc), a Blue-ray Disc (registered trademark), a magnetic disk, a semiconductor memory, or a memory card. Such a removable recording medium can be provided as so-called package software.

Furthermore, such a program can be downloaded from a download site through a network such as a LAN (Local Area Network) or the Internet, in addition to the installation from the removable recording medium to a personal computer and the like.

Furthermore, such a program is suitable for the image processing apparatus of the embodiment to be extensively provided. For example, the program is downloaded to a personal computer, a portable information processing apparatus, a cellular phone, a game machine, a video player, a PDA (Personal Digital Assistant) and the like, so that the portable information processing apparatus and the like are available as the image processing apparatus according to an embodiment of the present technology. For example, in a computer apparatus as illustrated in FIG. 17, the same processes as those for the emphasis display function in the image processing apparatus 1, the imaging apparatus 10, and the reproduction apparatus 50 can be performed.

Figure 17:
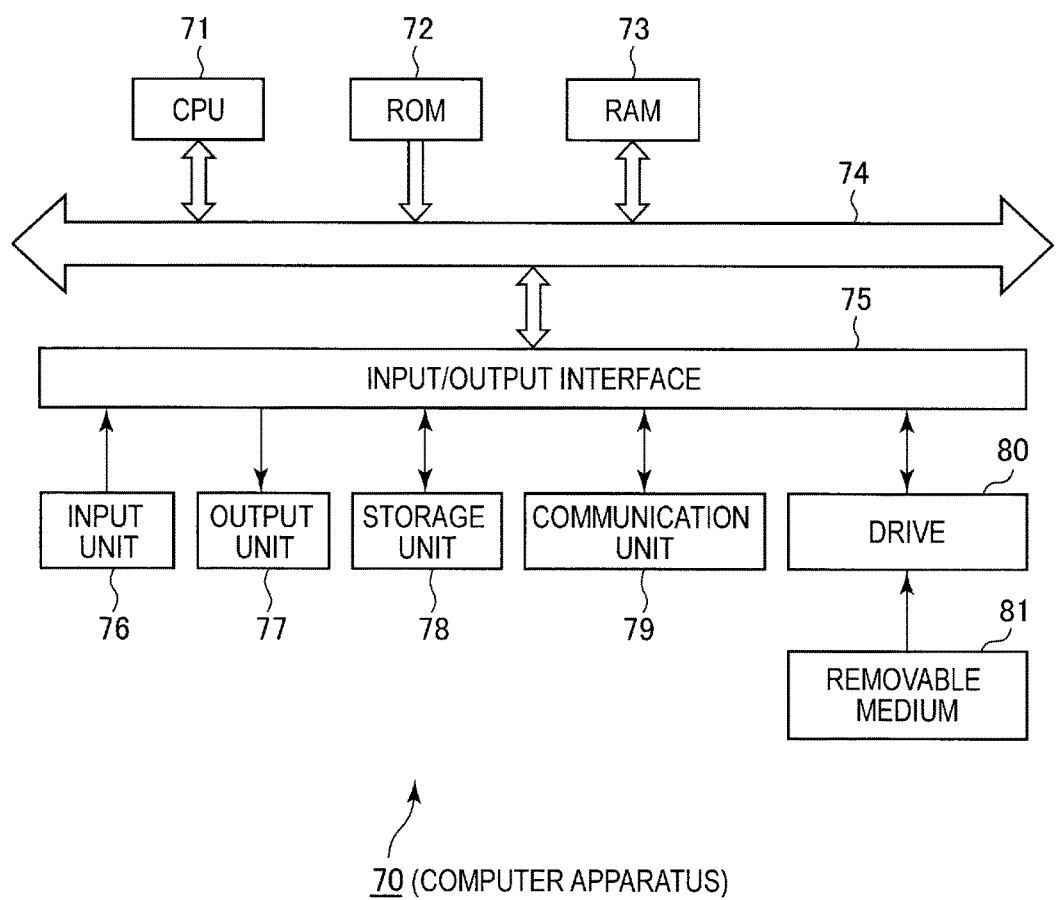
FIG. 17 is a block diagram of a computer apparatus according to an embodiment.

In FIG. 17, a CPU 71 of a computer apparatus 70 performs various processes according to a program stored in a ROM 72 or a program loaded from a storage unit 78 to a RAM 73. Furthermore, the RAM 73 appropriately stores data and the like which are necessary when the CPU 71 performs the various processes.

The CPU 71, the ROM 72, and the RAM 73 are connected to one another through a bus 74. Furthermore, an input/output interface 75 is also connected to the bus 74.

The input/output interface 75 is connected to an input unit 76 including a keyboard, a mouse and the like, an output unit 77 including a display, such as a CRT (Cathode Ray Tube), an LCD, or an organic EL panel, and a speaker, the storage unit 78 including a hard disk, and a communication unit 79 including a modem and the like. The communication unit 79 performs a communication process through a network including the Internet.

Furthermore, a drive 80 is connected to the input/output interface 75 according to necessity, a removable medium 81 such as a magnetic disk, an optical disc, a magneto optical disc, or a semiconductor memory is appropriately mounted on the input/output interface 75, and a computer program read from this is installed in the storage unit 78 according to necessity.

When the aforementioned emphasis display process is performed by software, a program constituting the software is installed from a network or a recording medium.

The recording medium, for example, as illustrated in FIG. 17, is configured by the removable medium 81 including a magnetic disk (including a flexible disk), an optical disc (including a Blue-ray disc, a CD-ROM, and a DVD), a magneto optical disc (including a MD (Mini Disc)), a semiconductor memory and the like which are distributed to deliver a program to a user, separately from an apparatus body, and record the program. Alternatively, the recording medium is also configured by the ROM 72, a hard disk included in the storage unit 78, and the like, which are embedded in the apparatus body and delivered to a user and record the program.

In such a computer apparatus 70, by the reception operation in the communication unit 79 or the reproduction operation in the drive 80 (the removable media 81) or the storage unit 78, when moving image data is input, the CPU 71 performs processes as illustrated in FIG. 2A, FIG. 2B, FIG. 6 and FIG. 7, FIG. 10 and FIG. 11, FIG. 12, FIG. 14, or FIG. 15 based on the program, so that it is possible to perform a display operation including emphasis display for the input image data.

10. Modification Example

For each aforementioned embodiment, various modification examples can be considered.

The selection candidate image in the image processing apparatus 1, the imaging apparatus 10, the reproduction apparatus 50, and the computer apparatus 70 is not limited to a facial image. For example, when a person is a target, a body image may be a target instead of the facial image. Furthermore, also in the case of employing a facial image of a specific attribute, rather than a sex or an age group, a feature appearing in an image, for example, a facial image of a person wearing glasses or a facial image of a person wearing a cap, may be extracted as a selection candidate image.

Furthermore, rather than a person, a pet such as a dog or a cat, a plant such as a flower or a tree, a building and the like may be extracted as a selection candidate image.

In addition, facial detection, human body detection and the like are possible through a technique and the like of pattern mapping in image analysis for image data. However, other types of detection are basically possible by merely changing a dictionary used in the pattern mapping. For example, detection of (a specific type of) dog, a cat and the like are possible.

Furthermore, for example, detecting a moving body through a moving body detection technique based on a frame difference and employing the moving body as a candidate image may also be considered. A technique of extraction and selection of a selection candidate image may be variously considered.

Furthermore, in examples of all the embodiments, when a moving image is a target, detection of a selection candidate image may not be performed for each frame and may be performed at intermittent frame intervals such as every frame, every five frames, every 60 frames, or every 300 frames. In this way, processing loads of the control units (1, 30, 50 and the like) for the emphasis display function are also reduced.

Furthermore, in the examples of all the embodiments, even when the moving image is a target, the detection of the selection candidate image is performed for each frame, and update of selection candidate image data itself of a facial image and the like in the candidate information storage units (27 and 63) may be performed at a longer interval. That is, an image itself for generating the candidate presentation image 201 such as a facial list is updated with low necessity for each frame in the case of the same object, and for example, displaying the image on the facial list 201 as a still provides good visibility.

In the description of the processing example (the first embodiment as the imaging apparatus) of FIG. 6, detected facial images are tracked and the same ID is assigned to the continuously tracked facial images over a plurality of frames, thereby obtaining an effect that each facial image is easily seen and selected on the facial list 201. However, a processing example in which the tracking is not performed in each embodiment may also be considered.

When there is movement of an object, the facial images are frequently changed on the facial list 201. In some cases, an object with almost no movement such as a group photo is a target to be captured. Furthermore, as described above, selection candidate images are not limited to facial images, and a plant and the like are also assumed.

For example, when an object to be focused has slight to no movement, even if the selection candidate images are managed using IDs in a position order in an image for each frame without tracking, the selection candidate images are not frequently changed on the list. That is, for example, even if the IDs assigned to each selection candidate image correspond to positioning that employs a number of selection candidate images simply detected in the current frame, there is no problem if the IDs are listed for display in an order of the IDs. When such a use case is assumed, a process of managing the same object by assigning the same ID to the same object by a tracking process may not be performed.

Moreover, for example, when performing a process of performing facial image detection at a long interval such as once every 300 frames, and updating the candidate presentation image 201 in response to the detection, facial images are not frequently changed on the facial list as the candidate presentation image 201 in the first place, for example. In such a case, it is of course preferable to control an order on the list in response to ID setting according to tracking. However, even if the tracking is not performed constantly, ease of view of the candidate presentation image 201 is not lost. Accordingly, a processing example in which the tracking process is not performed may also be considered.

In the processing examples (the fourth embodiment of the imaging apparatus) of FIG. 14 or FIG. 15, the processes using the conditions of the frontal face, the attributes and the like for the facial images has been described. However, in addition to the facial images, predetermined conditions may be variously considered. For example, predetermined conditions for selecting an image to be employed in a candidate presentation image, such as a specific color, a kind of a specific animal, a plant of a specific color and the like, may be variously considered.

Furthermore, in each embodiment, various types of control may be performed for an object selected and emphasized for display.

For example, focusing on a selected object in the imaging apparatus 10 and performing exposure adjustment in response to the luminance of the selected object may be considered.

Furthermore, in the case of performing voice pick-up through a microphone together with capturing (for example, moving image capturing), performing directionality adjustment in response to the direction of an object being selected in a space of an angle of view may also be considered.

Furthermore, performing auto-zoom control corresponding to a selected object may also be considered. For example, automatic zoom lens driving is performed such that a selected object is reflected with a predetermined size or more on a captured image. Adjustment of an angle of view may be performed based on zoom corresponding to a change in a distance to the selected object according to a tracking process.

Furthermore, employing a trigger of the start of moving image capturing may also be considered. For example, moving image capturing recording is started according to the selection of an object.

Furthermore, various types of signal processing for a captured image signal are also possible.

For example, image processing, such as quality adjustment, noise reduction, or flesh color adjustment, is applied only to an area of an object selected in each captured frame.

Alternatively, application of an image effect, for example, mosaic processing, airbrushing, painting-out processing, out of an area of the selected object may also be considered.

Furthermore, application of editing, such as flaming or cropping, to a captured image or a recorded image may also be considered.

For example, it is possible to perform processing, such as cutting or expansion of a partial area of a frame including a selected object.

Furthermore, it is possible to perform cutting and the like of an image peripheral part in captured image data such that a selected object is arranged at the center of an image, and to perform composition.

The above is for illustrative purposes only. In addition, a process in which an application program or an automatic adjustment function of the imaging apparatus 10 uses a selection result of an object may be variously considered.

Furthermore, the present technology is also applicable to monitoring camera use (recording start determination). For example, facial list display or emphasis display corresponding to selection is performed on a monitored image or a reproduced image thereof, so that the present technology is effective when an observer finds a suspicious individual.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including: a control device to: generate display data including a main image for display in a first area of a display area and a list of candidate images for display in a second area of the display area at a same time the main image is displayed in the first area, wherein the candidate images are extracted from and represent respective objects in the main image; and receive an input from a user to select one candidate image from the list, wherein the display data is generated based on selection of the one candidate image.

(2) The apparatus according to (1), wherein the main image is a moving image.

(3) The apparatus according to (1) or (2), wherein a first candidate image in the list includes a facial image which is extracted from the main image based on analysis of whether a facial portion of the object corresponding to the first candidate image is in the main image.

(4) The apparatus according to any of one (1) to (3), wherein a portion in the first area corresponding to a first candidate image selected from the list is indicated with an indicator as emphasis or a mark.

(5) The apparatus according to any of one (1) to (4), wherein the list displayed in the second area disappears based on selection of a candidate image from the list by the user.

(6) The apparatus according to any of one (1) to (5), wherein display of the list in the second display area is ended based on selection by the user of a candidate image from the list.

(7) The apparatus according to any of one (1) to (6), wherein, while the list as the plurality of candidate images is displayed in the second area, a position of a first candidate image in the list is changed to a priority position in an order of the plurality of candidate images based on selection by the user of the first candidate image.

(8) The apparatus according to any of one (1) to (7), wherein, when tracking by the control device of an object in the main image corresponding to a first candidate image selected from the list is interrupted, a selection state of the first candidate image is released.

(9) The apparatus according to any of one (1) to (8), wherein, when tracking by the control device of an object in the main image corresponding to a first candidate image selected from the list is interrupted, a preferential detection size and a preferential detection area are set by the control device.

(10) The apparatus according to any of one (1) to (9), wherein the control device determines whether a position in a frame of a newly appearing object after the tracking is interrupted is in or near the preferential detection area.

(11) The apparatus according to any of one (1) to (10), wherein the control device determines whether a size of a newly appearing object in a frame after the tracking is interrupted coincides with or approximates the preferential detection size.

(12) The apparatus according to any of one (1) to (11), wherein a candidate image of the plurality of candidate images in the list displayed in the second area is changeable by a predetermined operation.

(13) The apparatus according to any of one (1) to (12), wherein the predetermined operation is a page turning operation or a scroll operation on the list.

(14) (The apparatus according to any of one (1) to (13), wherein display of the plurality of candidate images is prioritized by a predetermined condition set by a parameter.

(15) The apparatus according to any of one (1) to (14), wherein the parameter includes one of size, position in the main image or attribute.

(16) The apparatus according to any of one (1) to (15), wherein a size of a facial image as a candidate image in the list extracted from the main image is expanded or reduced with a predetermined size.

(17) The apparatus according to any of one (1) to (16), wherein the predetermined size is such that an individual corresponding to the facial image displayed is recognizable by the user.

(18) The apparatus according to any of one (1) to (17), wherein the main image is a monitoring image of a captured moving image outputted from an imaging device.

(19) An information processing method including: generating, by a control device, of display data including a main image for display in a first area of a display area and a list of candidate images for display in a second area of the display area at a same time the main image is displayed in the first area, wherein the candidate images are extracted from and represent respective objects in the main image; and receiving an input from a user to select one candidate image from the list, wherein the display data is generated based on selection of the one candidate image.

(20) A non-transitory recording medium on which is recorded a program executable by a computer, the program including: generating of display data including a main image for display in a first area of a display area and a list of candidate images for display in a second area of the display area at a same time the main image is displayed in the first area, wherein the candidate images are extracted from and represent respective objects in the main image; and receiving an input from a user to select one candidate image from the list, wherein the display data is generated based on selection of the one candidate image.

(21) An image processing apparatus including: a selection candidate detection unit that detects selection candidate images as an object image in a main image which is a dynamic image or a still image; a display data generation unit that generates display data using at least the main image; and a control unit that allows the display data generation unit to generate display data including a candidate presentation image by combining the selection candidate images detected in the selection candidate detection unit with the main image, and to generate display data including display in which an object image corresponding to a selected candidate presentation image is emphasized in the main image, in response to a selection operation for the candidate presentation image.

(22) The image processing apparatus according to (21), wherein the display data generation unit generates the display data including the candidate presentation image in which the selection candidate images are arranged, and the control unit assigns a same identifier to a selection candidate image determined as a same object in a plurality of frames included in the dynamic image as the main image, and controls a display order of the selection candidate images in the candidate presentation image based on the identifier.

(23) The image processing apparatus according to (21) or (22), wherein the control unit allows the display data generation unit to generate the display data including the candidate presentation image even after the selection operation for the candidate presentation image.

(24) The image processing apparatus according to any one of (21) to (23), wherein the control unit allows the display data generation unit to perform display of emphasizing a selected selection candidate image on the candidate presentation image in response to the selection operation for the candidate presentation image.

(25) The image processing apparatus according to (21) or (24), wherein the control unit instructs the display data generation unit to end display of the candidate presentation image in response to the selection operation for the candidate presentation image.

(26) The image processing apparatus according to any one of (21) to (25), wherein, in a course of frame progression of the main image which is a dynamic image, based on a tracking result in each frame for an object image corresponding to a selection candidate image selected in the selection operation, the control unit instructs the display data generation unit such that a position of display, in which the object image is emphasized, is set.

(27) The image processing apparatus according to any one of (21) to (26), wherein the display data generation unit generates display data including the candidate presentation image in which the selection candidate images are arranged, and in the course of the frame progression of the main image which is a dynamic image, when tracking of the object image corresponding to the selection candidate image selected in the selection operation is not possible, the control unit sets a preferential detection condition, and performs control such that the selection candidate image is preferentially displayed on the candidate presentation image when the selection candidate image detected by the selection candidate detection unit satisfies the preferential detection condition.

(28) The image processing apparatus according to any one of (21) to (27), wherein the preferential detection condition is a condition based on a position or a size in the main image immediately before the tracking of the object image corresponding to the selection candidate image selected in the selection operation is not possible.

(29) The image processing apparatus according to any one of (21) to (28), wherein the control unit allows the display data generation unit to generate display data including the candidate presentation image using a selection candidate image satisfying a predetermined condition among the selection candidate images detected in the selection candidate detection unit.

(30) An image processing method including: detecting selection candidate images as an object image in a main image which is a dynamic image or a still image; generating display data including a candidate presentation image by combining the detected selection candidate images with the main image, and outputting the display data; and generating and outputting display data including display in which an object image corresponding to a selected candidate presentation image is emphasized in the main image, in response to a selection operation for the displayed candidate presentation image.

(31) A program for causing an arithmetic operation processing apparatus to perform:
a process of detecting selection candidate images as an object image in a main image which is a dynamic image or a still image; a process of generating display data including a candidate presentation image by combining the detected selection candidate images with the main image, and outputting the display data; and a process of generating and outputting display data including display in which an object image corresponding to a selected candidate presentation image is emphasized in the main image, in response to a selection operation for the displayed candidate presentation image.

REFERENCE SIGNS LIST 1 image processing apparatus
2, 26, 62 selection candidate detection unit
3, 28, 64 display data generation unit
4, 30, 51 control unit
10 capturing apparatus
11 optical system
12 imager
13 optical system driving unit
14 sensor unit
15 recording unit
16 communication unit
20 digital signal processing unit
21 pre-processing unit
22 synchronization unit
23 YC generation unit
24 resolution conversion unit
25 codec unit
27 candidate information storage unit
30a tracking processing unit
34 display unit
35, 53 operation unit
50 reproduction apparatus
70 computer apparatus
71 CPU

The invention claimed is:

1. An information processing apparatus comprising:
circuitry configured to:
generate display data including a main image for display in a first area of a display area and a list of candidate images for display in a second area of the display area at a same time the main image is displayed in the first area, wherein the candidate images are extracted from and represent respective objects in the main image; and
receive an input from a user to select one candidate image from the list, wherein the display data is generated based on selection of the one candidate image,
wherein, while the list as the plurality of candidate images is displayed in the second area, a position of a first candidate image in the list is changed to a priority position in an order of the plurality of candidate images based on selection by the user of the first candidate image.

2. The apparatus of claim 1, wherein the main image is a moving image.

3. The apparatus of claim 1, wherein a first candidate image in the list includes a facial image which is extracted from the main image based on analysis of whether a facial portion of the object corresponding to the first candidate image is in the main image.

4. The apparatus of claim 1, wherein a portion in the first area corresponding to a first candidate image selected from the list is indicated with an indicator as emphasis or a mark.

5. The apparatus of claim 1, wherein the list displayed in the second area disappears based on selection of a candidate image from the list by the user.

6. The apparatus of claim 1, wherein display of the list in the second display area is ended based on selection by the user of a candidate image from the list.

7. An information processing apparatus comprising:
circuitry configured to:
generate display data including a main image for display in a first area of a display area and a list of candidate images for display in a second area of the display area at a same time the main image is displayed in the first area, wherein the candidate images are extracted from and represent respective objects in the main image; and
receive an input from a user to select one candidate image from the list, wherein the display data is generated based on selection of the one candidate image,
wherein, when tracking by the circuitry of an object in the main image corresponding to a first candidate image selected from the list is interrupted, a selection state of the first candidate image is released.

8. An information processing apparatus comprising:
circuitry configured to:
generate display data including a main image for display in a first area of a display area and a list of candidate images for display in a second area of the display area at a same time the main image is displayed in the first area, wherein the candidate images are extracted from and represent respective objects in the main image; and receive an input from a user to select one candidate image from the list, wherein the display data is generated based on selection of the one candidate image, wherein, when tracking by the circuitry of an object in the main image corresponding to a first candidate image selected from the list is interrupted, a preferential detection size and a preferential detection area are set by the circuitry.

9. The apparatus of claim 8, wherein the circuitry determines whether a position in a frame of a newly appearing object after the tracking is interrupted is in or near the preferential detection area.

10. The apparatus of claim 8, wherein the circuitry determines whether a size of a newly appearing object in a frame after the tracking is interrupted coincides with or approximates the preferential detection size.

11. The apparatus of claim 1, wherein a candidate image of the plurality of candidate images in the list displayed in the second area is changeable by a predetermined operation.

12. The apparatus of claim 11, wherein the predetermined operation is a page turning operation or a scroll operation on the list.

13. The apparatus of claim 1, wherein display of the plurality of candidate images is prioritized by a predetermined condition set by a parameter.

14. The apparatus of claim 13, wherein the parameter includes one of size, position in the main image or attribute.

15. The apparatus of claim 1, wherein a size of a facial image as a candidate image in the list extracted from the main image is expanded or reduced with a predetermined size.

16. The apparatus of claim 15, wherein the predetermined size is such that an individual corresponding to the facial image displayed is recognizable by the user.

17. The apparatus of claim 1, wherein the main image is a monitoring image of a captured moving image outputted from an imaging device.

18. An information processing method comprising:
generating, by circuitry, of display data including a main image for display in a first area of a display area and a list of candidate images for display in a second area of the display area at a same time the main image is displayed in the first area, wherein the candidate images are extracted from and represent respective objects in the main image; and
receiving an input from a user to select one candidate image from the list, wherein the display data is generated based on selection of the one candidate image,
wherein, while the list as the plurality of candidate images is displayed in the second area, a position of a first candidate image in the list is changed to a priority position in an order of the plurality of candidate images based on selection by the user of the first candidate image.

19. A non-transitory recording medium on which is recorded a program executable by a computer, the program comprising:
generating of display data including a main image for display in a first area of a display area and a list of candidate images for display in a second area of the display area at a same time the main image is displayed in the first area, wherein the candidate images are extracted from and represent respective objects in the main image; and
receiving an input from a user to select one candidate image from the list, wherein the display data is generated based on selection of the one candidate image,
wherein, while the list as the plurality of candidate images is displayed in the second area, a position of a first candidate image in the list is changed to a priority position in an order of the plurality of candidate images based on selection by the user of the first candidate image.

* * * * *